(12) United States Patent
Yoshida

(10) Patent No.: US 7,730,417 B2
(45) Date of Patent: Jun. 1, 2010

(54) TERMINAL APPARATUS, NETWORK SYSTEM, WINDOW DISPLAY METHOD, AND COMPUTER PROGRAM

(75) Inventor: Koji Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 11/436,580

(22) Filed: May 19, 2006

(65) Prior Publication Data

US 2006/0265665 A1 Nov. 23, 2006

(30) Foreign Application Priority Data

May 19, 2005 (JP) .............................. 2005-147021

(51) Int. Cl.
*G06F 3/00* (2006.01)
*G06F 3/14* (2006.01)
(52) U.S. Cl. ........................ 715/794; 715/765; 715/790; 715/802
(58) Field of Classification Search ................. 715/764, 715/765, 781, 788, 790, 794, 795, 796, 797, 715/802
See application file for complete search history.

(56) References Cited

U.S. PATENT DOCUMENTS

| 5,640,590 | A | | 6/1997 | Luther | 395/806 |
| 5,841,420 | A | * | 11/1998 | Kaply et al. | 345/421 |
| 6,025,841 | A | * | 2/2000 | Finkelstein et al. | 715/803 |
| 7,168,048 | B1 | * | 1/2007 | Goossen et al. | 715/797 |
| 7,460,108 | B2 | * | 12/2008 | Tamura | 345/169 |
| 2003/0058241 | A1 | * | 3/2003 | Hsu | 345/426 |
| 2005/0138567 | A1 | * | 6/2005 | Smith et al. | 715/763 |
| 2006/0206825 | A1 | * | 9/2006 | Dorn et al. | 715/761 |
| 2006/0282548 | A1 | | 12/2006 | Yoshida et al. | 710/1 |

FOREIGN PATENT DOCUMENTS

| JP | 07-078074 | 3/1995 |
| WO | WO 2006/025549 | 3/2006 |

* cited by examiner

*Primary Examiner*—X. L Bautista
(74) *Attorney, Agent, or Firm*—Fitzpatrick, Cella, Harper & Scinto

(57) ABSTRACT

Upon reception of data updating information from a server apparatus (14) in a situation in which a presentation window is "closed" or "minimized" on a display unit (24) of each of terminal apparatuses (11-13), that presentation window is displayed on the display unit (24). The user who uses each of the terminal apparatuses (11-13) can always recognize a change in situation of the presentation system.

15 Claims, 19 Drawing Sheets

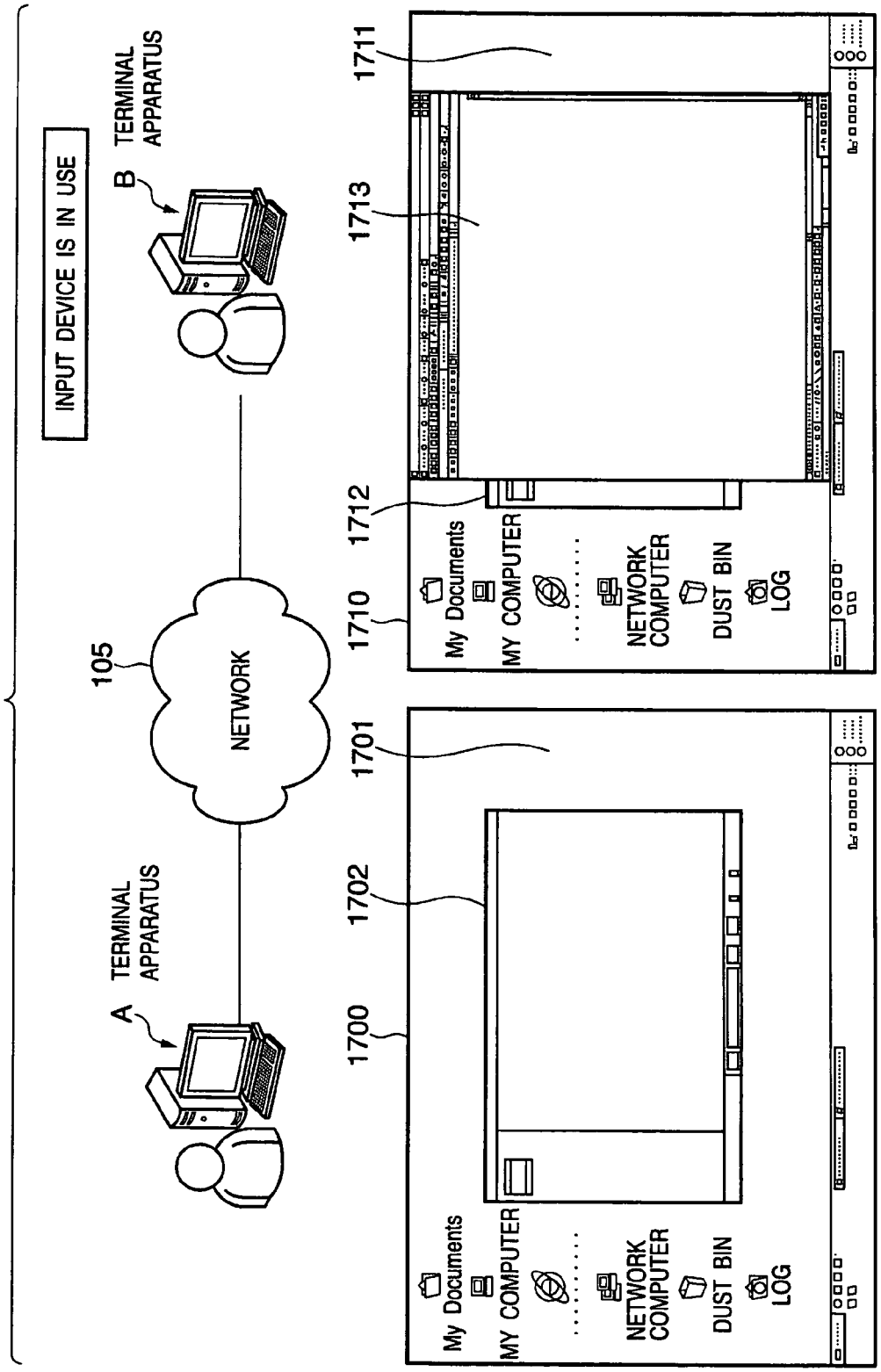

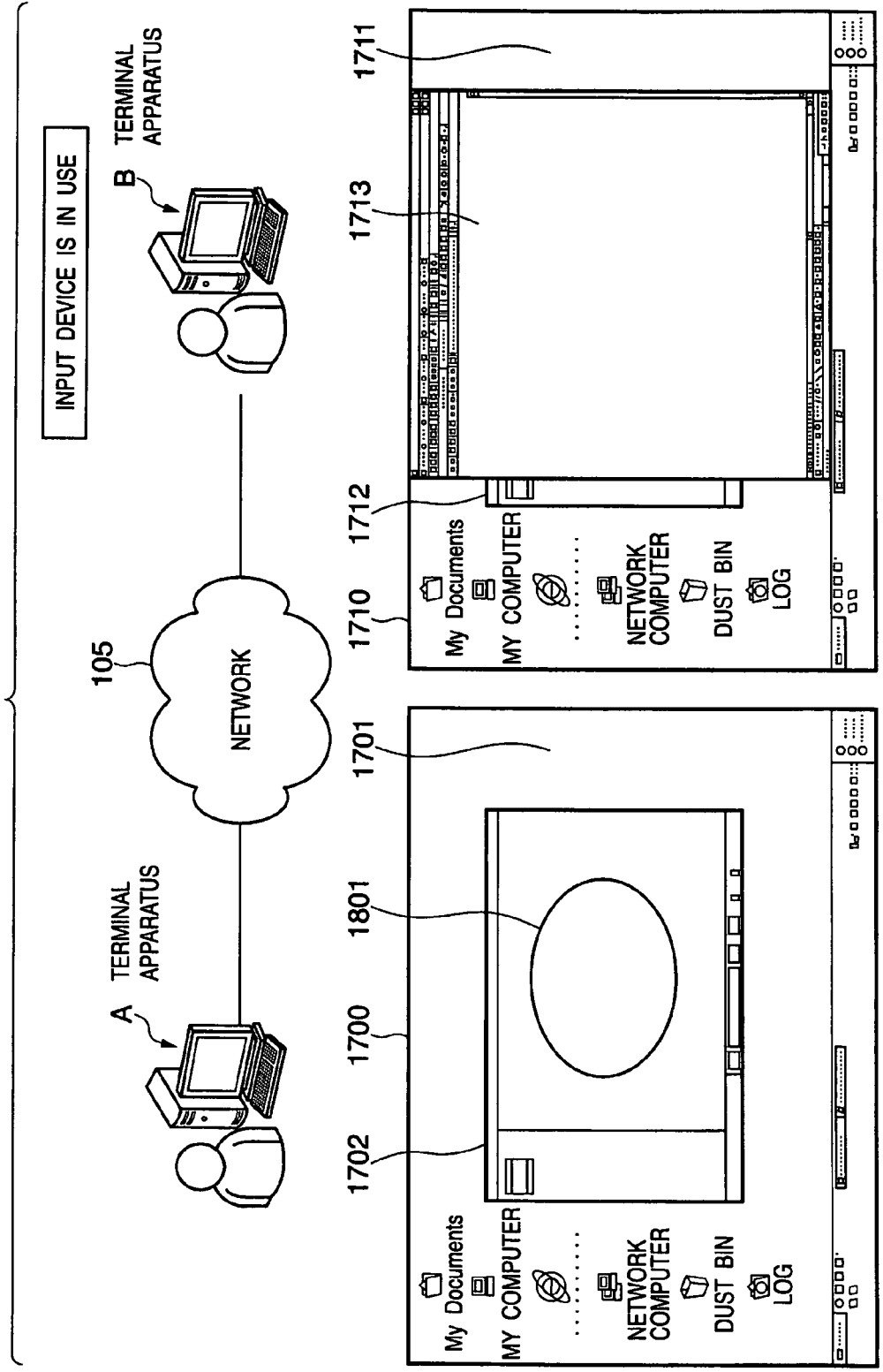

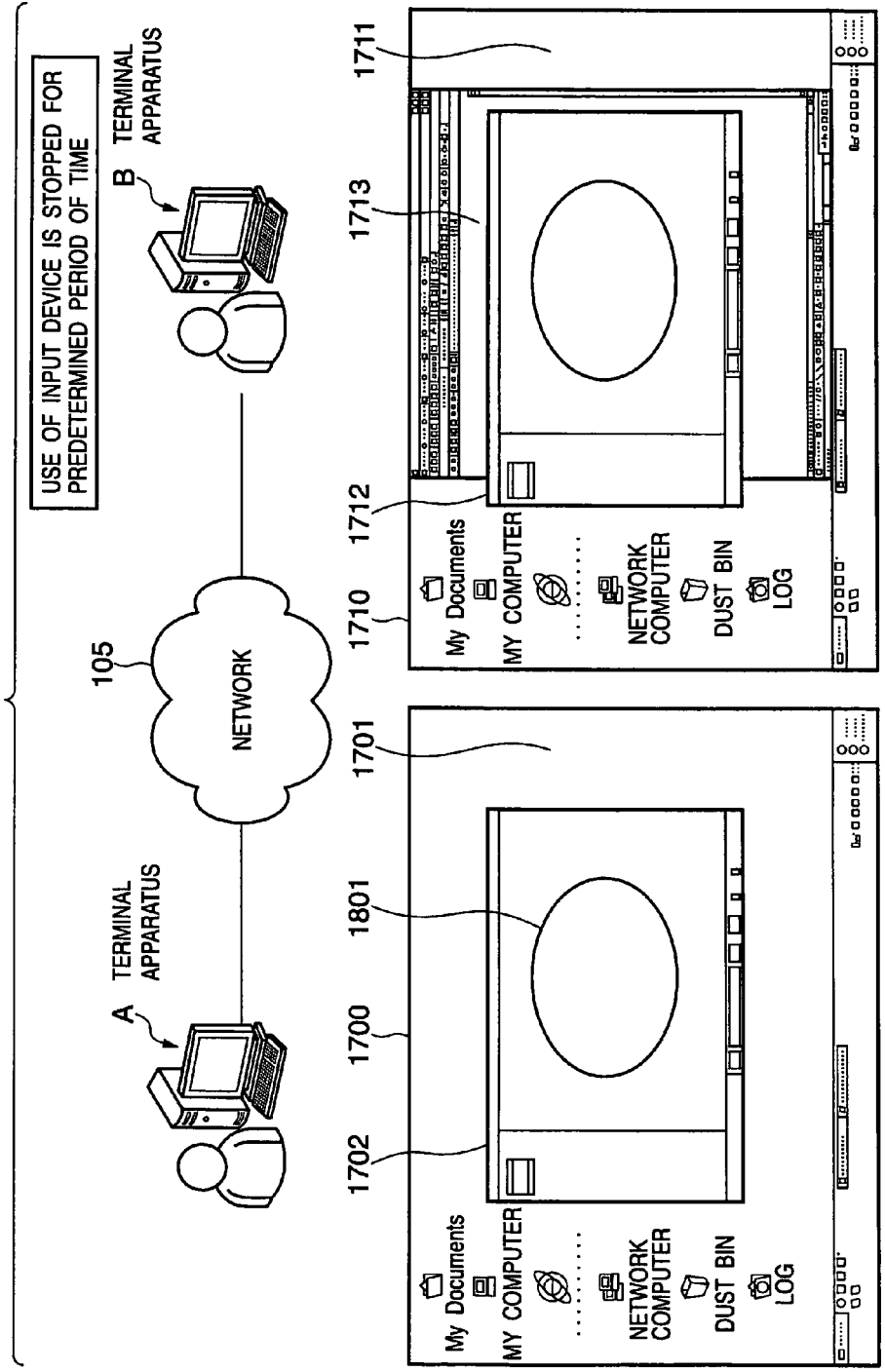

TERMINAL APPARATUS, NETWORK SYSTEM, WINDOW DISPLAY METHOD, AND COMPUTER PROGRAM

FIELD OF THE INVENTION

The present invention relates to a terminal apparatus, network system, window display method, and computer program and, more particularly, to a technique suitably used to reflect display information displayed on a given terminal apparatus of a plurality of terminal apparatuses connected via a network on the display screens of other terminal apparatuses.

BACKGROUND OF THE INVENTION

In recent years, presentation systems have prevailed in companies, government offices, and autonomous communities. The following items (1) to (3) are the main factors of such prevalence.

(1) Recently, network environments and processing performance of computers have greatly improved, and information with a large data size can be exchanged and processed in real time. For this reason, it is possible to make large-capacity data communications free from any delay, which are important in the presentation system.

(2) In recent years, in companies, government offices, and autonomous communities, globalization is in progress, and a situation called a distributed service in which working partners who have business relations work at sites distributed nationwide and worldwide is increasing. Under such a situation, when working partners get together to attend a conference, a huge amount of labor is required. Hence, when the presentation system is innovated, such labor can be avoided, and working partners can attend the conference without physically moving to the site of the conference.

(3) Companies, government offices, and autonomous communities have struggled to reduce costs required for conferences as much as possible. If the presentation system is used, participants of the conference need not get together to one place, thus reducing money and time required for the participants to get together in one place.

When the presentation system is used, the participants of the conference can share display of documents, images, and Web pages at remote places, can synchronize the display screens, and can annotate documents.

Many of presentation systems are combined with video conferencing systems and Web conferencing systems. As a result, the presentation system becomes more convenient and has multiple functions. For example, participants of a conference can utilize the video conferencing systems or Web conferencing systems, and can confirm each other's faces or can make text chatting.

As an example of the presentation system, "WebEx Meeting Center" available from WebEx Communications, Inc. or the like is known. This "WebEx Meeting Center" is characterized in that it can be used anywhere in environments that allow Internet connections, and has many functions. For example, in the "WebEx Meeting Center", confirmation of lists of presentations and participants, or text chatting and voting can be made on a single window. The "WebEx Meeting Center" allows the user to make most of all operations on a single window, thus assuring high operability. The user can simultaneously confirm operations of a plurality of functions.

Also, as another presentation system, Japanese Patent Laid-Open No. 7-78074 is available.

However, the aforementioned conventional presentation systems suffer the following problems.

The presentation system requires a large window size. The presentation system has multiple functions as its sales point, and uses many GUIs (Graphical User Interfaces) as its feature. Most of presentation systems implement all GUIs using a single window in consideration of operability. Since the window size becomes inevitably large, the presentation system and another application cannot be displayed at the same time. When any other application is to be used, the large window of the presentation system is obstructive.

In order to solve such problem, the window may be hidden by selecting a "close" or "minimize" button of the window. However, in such case, another problem is posed.

That is, when the window is hidden, the user cannot recognize the situation of presentations. For example, when another participant shares new presentation data, adds annotation data, or switches synchronous display to another presentation data, the user cannot recognize such situation change if the window is hidden.

In this way, in the conventional presentation system, when the window is hidden from the user, even when the situation of presentations has changed, the window remains hidden from user's eye. Therefore, the user cannot recognize any changes in the presentations.

The present invention has been made in consideration of such problems, and has as its first object to allow the user to recognize a change in display on a window of a terminal apparatus even when that window is hidden.

It is the second object of the present invention to allow the user to recognize a specific change in displayed contents on the window even when window is hidden on the terminal apparatus.

It is the third object of the present invention to allow the user to recognize a change in displayed contents on a window without disturbing input to another application when the window is hidden on the terminal apparatus.

SUMMARY OF THE INVENTION

In order to achieve at least one of the above objects, a terminal apparatus according to the present invention is characterized by mainly having the following arrangement.

According to the present invention, a terminal apparatus comprising:

a data communication unit adapted to transmit and receive data via a network;

a window display control unit adapted to control a display of a window associated with the data received by the data communication unit on a display screen; and a display information updating unit adapted to update display information on the window controlled by the window display control unit based on the data received by the data communication unit.

Alternatively, a network system according to the present invention is characterized by having a plurality of terminal apparatuses, and also a network used to interconnect the plurality of terminal apparatuses to be able to communicate with each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 shows the first example of screens displayed on two terminal apparatuses upon exchanging data between these terminal apparatuses according to the fourth embodiment of the present invention;

FIG. 18 shows the second example of screens displayed on two terminal apparatuses upon exchanging data between these terminal apparatuses according to the fourth embodiment of the present invention; and FIG. 19 shows the third example of screens displayed on two terminal apparatuses upon exchanging data between these terminal apparatuses according to the fourth embodiment of the present invention.

DETAILED DESCRIPTION OF THE PREFERRED EMBODIMENTS

Preferred embodiments of the present invention will now be described in detail in accordance with the accompanying drawings.

First Embodiment

The first embodiment of the present invention will be described in detail hereinafter.

Figure 1:
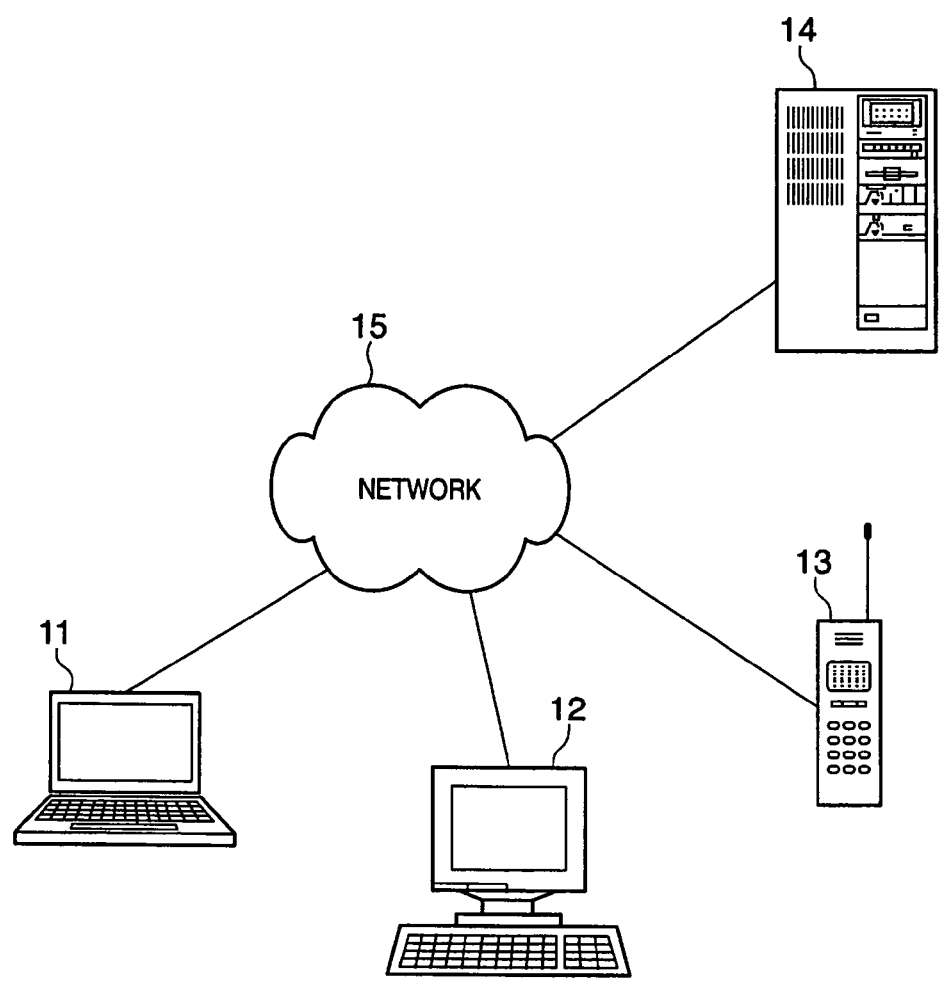
FIG. 1 is a view showing an example of the arrangement of a presentation system according to the first embodiment of the present invention.

FIG. 1 shows an example of the arrangement of a presentation system (network system). Referring to FIG. 1, each of terminal apparatuses 11 to 13 includes a communication function, and is connected to a network 15. Note that each of the terminal apparatuses 11 to 13 comprises a terminal computer and program data for a presentation system terminal apparatus. A server apparatus 14 includes a communication function, and is connected to the network 15 as in the terminal apparatuses 11 to 13. Note that the server apparatus 14 comprises a server computer and program data for a presentation system server apparatus.

Figure 2:
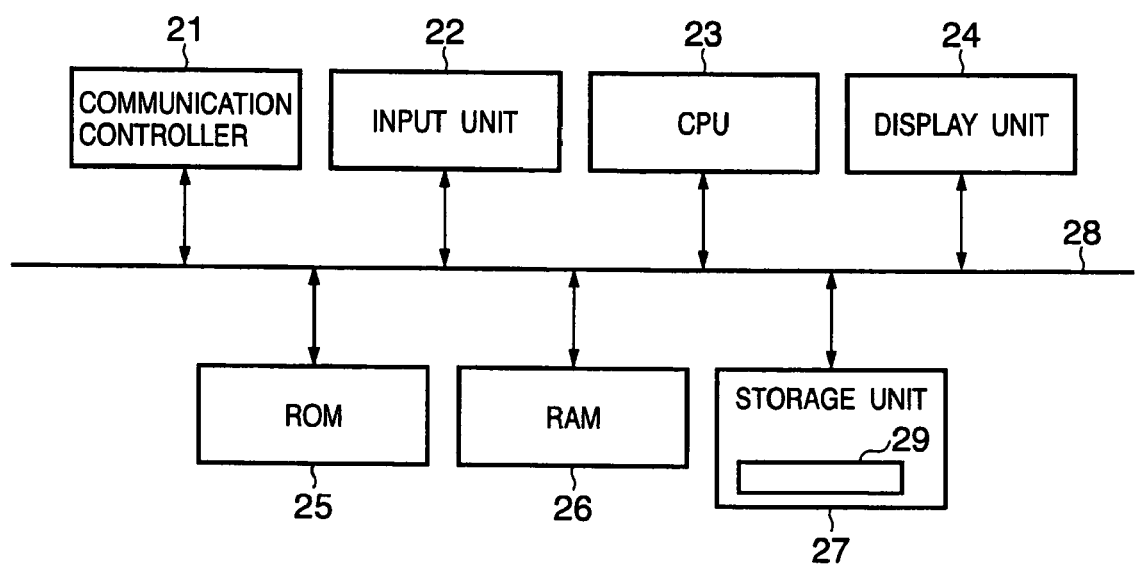
FIG. 2 is a block diagram showing an example of the arrangement of a terminal apparatus according to the first embodiment of the present invention.

FIG. 2 is a block diagram showing an example of the arrangement of the terminal apparatuses 11 to 13. All of the terminal apparatuses 11 to 13 comprise the arrangement shown in FIG. 2.

As described above, each of the terminal apparatuses 11 to 13 comprises the terminal computer and program data for the presentation system terminal apparatus.

More specifically, the terminal computer comprises a communication controller 21, input unit 22, CPU 23, display unit 24, ROM (Read Only Memory) 25; RAM (Random Access Memory) 26, and storage unit 27.

The program data for the presentation system terminal apparatus is stored in the storage unit 27, and is read out onto the RAM 26 by the CPU 23.

The communication controller 21 processes communication control required to connect the network 15. This communication controller 21 can comprise various communication interfaces according to a user's equipment environment. For example, when an access network is to be directly connected, the communication controller 21 comprises various modems, terminal adapters, or the like. When an ADSL modem or cable modem as an external device is to be connected, the communication controller 21 comprises an Ethernet interface.

The input unit 22 comprises a keyboard, pointing device (mouse), and the like of the terminal computer, and detects message information input by the user. Note that the input unit 22 can also comprise a video camera in addition to the keyboard and pointing device. When the input unit 22 comprises the video camera, it converts image information into an electrical signal, and detects this electrical signal as one type of message information.

The CPU 23 executes processing designated by the program data for the presentation system terminal apparatus in addition to the control of the overall terminal computer.

The display unit 24 comprises a CRT (Cathode Ray Tube) display or liquid crystal display, and a control circuit of that display.

The ROM 25 stores commands and data required for the operation of the CPU 23.

The RAM 26 is used as a work memory required for the operation of the CPU 23.

The storage unit 27 comprises a hard disk drive, and stores data required upon execution of the program for the presentation system terminal apparatus in addition to the program for the presentation system terminal apparatus.

Note that the blocks 21 to 27 are connected to a system bus 28.

As described above, the program data for the presentation system terminal apparatus which forms each of the terminal apparatuses 11 to 13 corresponds to information 29 stored in the storage unit 27, and the terminal computer corresponds to the units 21 to 28.

Figure 3:
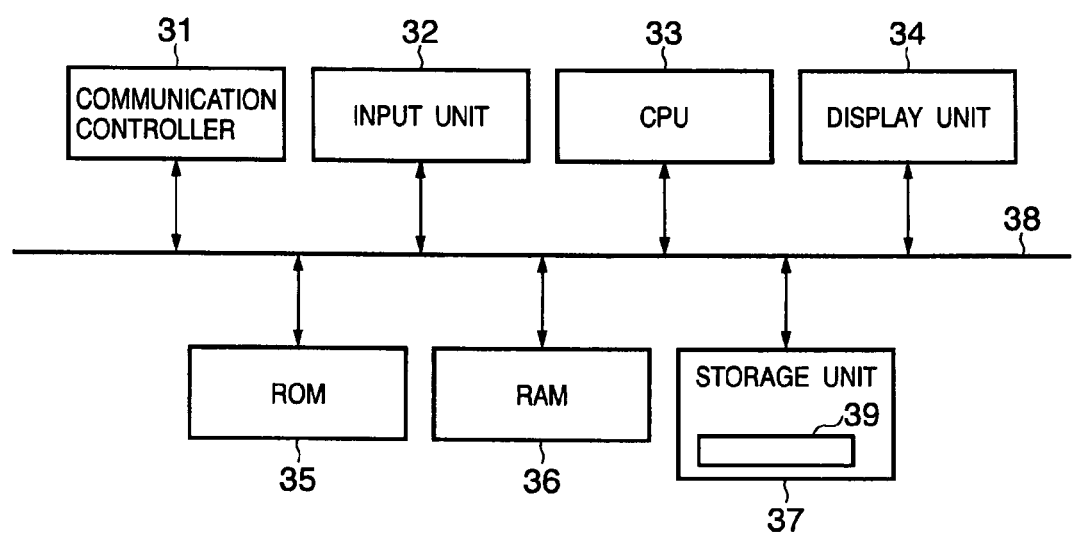
FIG. 3 is a block diagram showing an example of the arrangement of a server apparatus according to the first embodiment of the present invention.

FIG. 3 is a block diagram showing an example of the arrangement of the server apparatus 14.

As described above, the server apparatus 14 comprises the server computer and program data for the presentation system server apparatus. More specifically, the server computer comprises a communication controller 31, input unit 32, CPU 33, display unit 34, ROM 35, RAM 36, and storage unit 37. The program data for the presentation system server apparatus is stored in the storage unit 37, and is read out onto the RAM 36 by the CPU 33.

The communication controller 31 processes communication control required to connect the network 15. Normally, the server apparatus 14 is set in an NOC (Network Operation Center) of an Internet service provider close to a backbone network. For this reason, the communication controller 31 comprises a fast Ethernet interface used to connect a router of the NOC as a communication interface.

The input unit 32 comprises a keyboard, pointing device (mouse), and the like of the server computer. Note that the server apparatus 14 is managed only via the network without any input unit 32.

The CPU 33 executes processing designated by the program data for the presentation system server apparatus in addition to control of the overall server computer.

The display unit 34 comprises a CRT (Cathode Ray Tube) display or liquid crystal display, and a control circuit of that display.

The ROM 35 stores commands and data required for the operation of the CPU 33.

The RAM 36 is used as a work memory required for the operation of the CPU 33.

The storage unit 37 comprises a hard disk drive, and stores data required upon execution of the program for the presentation system server apparatus, user database information, and the like in addition to the program for the presentation system server apparatus.

Note that the blocks 31 to 37 are connected to a system bus 38.

As described above, the program data for the presentation system server apparatus which forms the server apparatus 14 corresponds to information 39 stored in the storage unit 37, and the server computer corresponds to the units 31 to 38.

Figure 9:
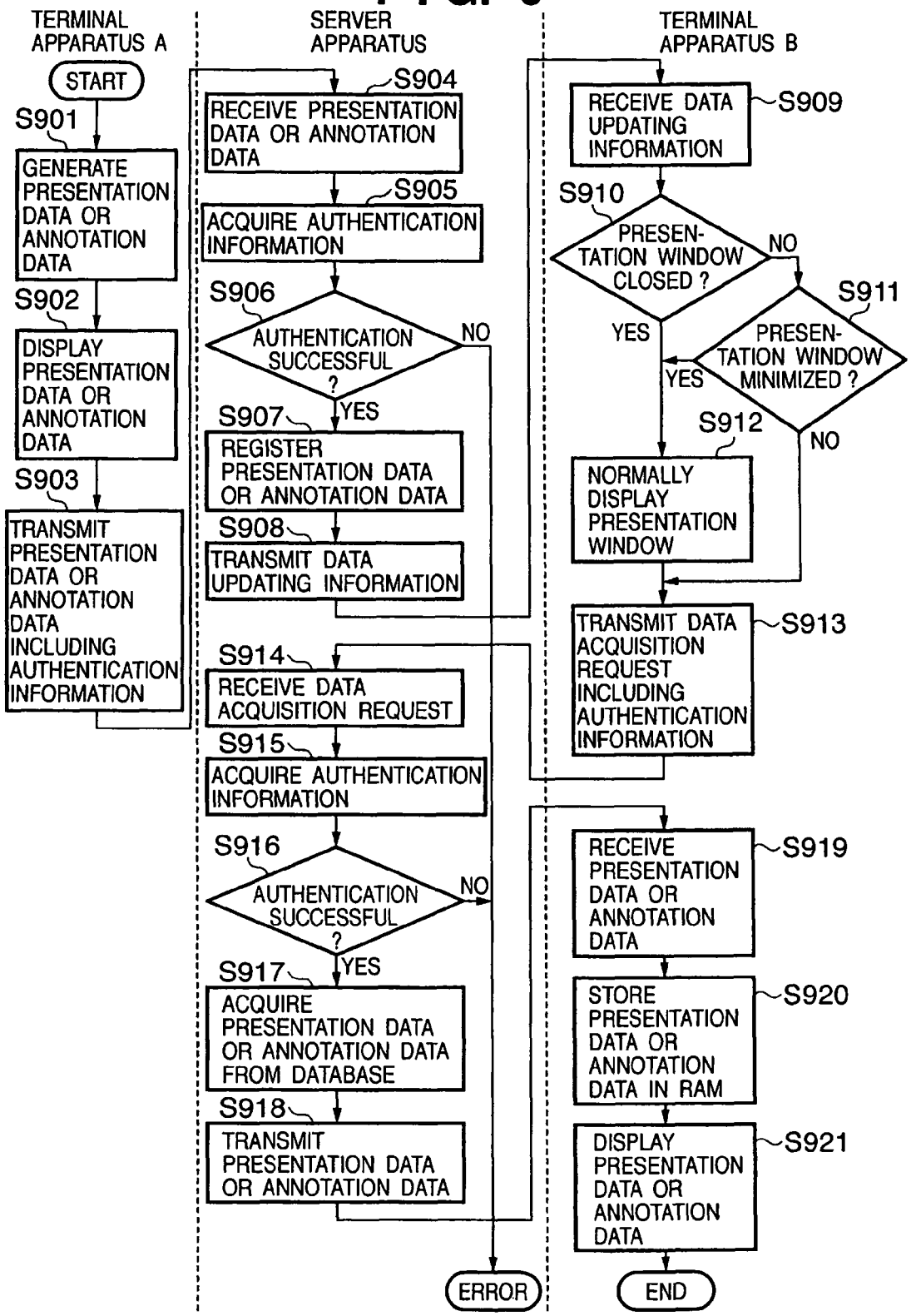
FIG. 9 is a flowchart for explaining an example of the operation of the presentation system upon sharing presentation data or annotation data according to the first embodiment of the present invention.

An example of the operation of the presentation system upon sharing presentation data or annotation data will be described below with reference to the flowchart of FIG. 9. FIG. 9 exemplifies a case wherein in order to share presentation data or annotation data, terminal apparatus A as arbitrary one of the terminal apparatuses 11 to 13 sends data to terminal apparatus B as another one of the terminal apparatuses 11 to 13 via the server apparatus 14.

The flowchart in FIG. 9 is implemented when the CPUs 23 and 33 execute processing based on the program data for the presentation system terminal apparatus, and the program data for the presentation system server apparatus, which are respectively stored in the storage units 27 and 37.

For the sake of simplicity, assume that the terminal apparatuses 11 to 13 and the server apparatus 14 have already established connection to the network 15 using their communication controllers 21 and 31.

Also, assume that each of the terminal apparatuses 11 to 13 has already logged in the program for the presentation system server apparatus stored in the server apparatus 14 by executing the program for the presentation system terminal apparatus stored in the storage unit 27.

Note that the processing in the presentation system is implemented by executing the program for the presentation system terminal apparatus stored in each of the terminal apparatuses 11 to 13, and the program for the presentation system server apparatus stored in the server apparatus 14.

When terminal apparatus A has logged in the presentation system, it displays a conference room window screen 40 (see FIG. 4) on the display unit 24 under the control of the program data for the presentation system terminal apparatus. The conference room window screen 40 displays a camera image 41 of a login user, and a list 42 of other participants. When the user selects a link that describes "remote presentation" by operating the input unit 22 (mouse) on the conference room window screen 40, terminal window A displays a presentation window 50 (see FIG. 5) on the display unit 24.

When presentation data is to be shared with other terminal apparatuses while the presentation window 50 is displayed on the display unit 24, the CPU 23 of terminal apparatus A generates presentation data on the RAM 26 (step S901). The CPU 23 of terminal apparatus A displays a presentation window 60 based on the generated new presentation data on the display unit 24 (step S902). The presentation window 60 makes a normal display 61 of the newly added presentation data, and a thumbnail display 62 of that newly added presentation data.

When annotation data is to be shared with other terminal apparatuses in the same state, the CPU 23 of terminal apparatus A generates annotation data on the RAM 26 (step S901). The CPU 23 of terminal apparatus A displays a presentation window 70 added with new annotation data 71 generated on the presentation window 50 on the display unit 24 (step S902; see FIG. 7).

The CPU 23 of terminal apparatus A adds authentication information such as the user name of terminal apparatus A that uses the presentation system, session information, and the like to the presentation data or annotation data generated in step S902. The CPU 23 of terminal apparatus A transmits the presentation data or annotation data added with the authentication information to the CPU 33 of the server apparatus 14 via the communication controller 21, the network 15, and the communication controller 31 of the server apparatus 14 (step S903).

The CPU 33 of the server 14 receives the presentation data or annotation data transmitted from terminal apparatus A in step S903 (step S904), and acquires the authentication information of the user of terminal apparatus A (step S905). The CPU 33 of the server apparatus 14 checks using the program for the presentation system server apparatus stored in the storage unit 37 if the acquired authentication information matches information of the user database stored in the storage unit 37 (step S906). If it is determined as a result of checking that these two pieces of information do not match, an error is generated to end the processing; otherwise, the flow advances to step S907.

In step S907, the CPU 33 of the server apparatus 14 stores the presentation data or annotation data received in step S904 in a presentation database in the storage unit 37.

The CPU 33 of the server apparatus 14 transmits data updating information used to notify that the presentation data or annotation data is updated to another terminal apparatus B which has logged in the presentation system (step S908). Note that the other terminal apparatus B which has logged in the presentation system is, for example, a terminal apparatus possessed by a user who uses the same conference room as the user of terminal apparatus A.

After that, the CPU 23 of terminal apparatus B receives the data updating information transmitted from the server apparatus 14 in step S908 (step S909). The CPU 23 of terminal apparatus B checks if the presentation window is closed on the display unit 24 (step S910). If it is determined as a result of checking that the presentation window is closed, the flow advances to step S912 while skipping step S911.

On the other hand, if the presentation window is not closed, the flow advances to step S911, and the CPU 23 of terminal apparatus B checks if the presentation window displayed on the display unit 24 is minimized. If it is determined as a result of checking that the presentation window is minimized, the flow advances to step S913 while skipping step S912. On the other hand, if the presentation window is not minimized, the flow advances to step S912.

Figure 8:
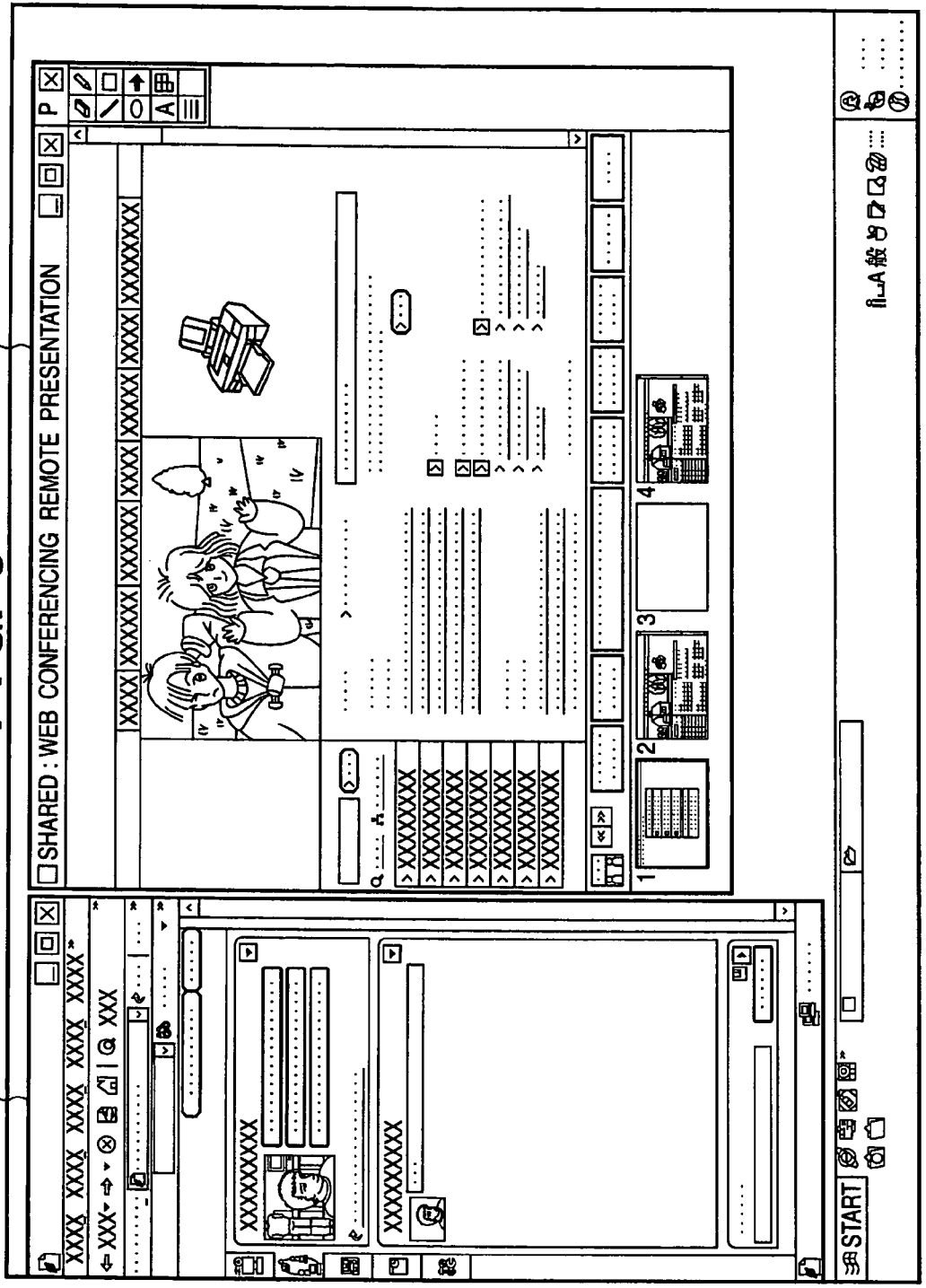
FIG. 8 shows another example of a presentation window according to the first embodiment of the present invention.

In step S912, the CPU 23 of terminal apparatus B normally displays a presentation window 80 on the display unit 24, as shown in FIG. 8. In FIG. 8, a conference room window 81 is displayed in the neighborhood of the presentation window 80. The CPU 23 of terminal apparatus B transmits a data acquisition request to the server apparatus 24 to acquire data associated with the data updating information received in step S904 (step S913). Note that this data acquisition request is transmitted while being added with authentication information such as the user name who uses the presentation system using terminal apparatus B, session information, and the like.

The data associated with the data updating information is data or the like, which is newer than the acquisition time of the data updating information, of the user database information stored in the storage unit 37 of the server apparatus 14. In addition, if the data updating information includes a data ID, the data associated with the data updating information may be data or the like having that data ID.

The CPU 33 of the server apparatus 14 receives the data acquisition request transmitted from terminal apparatus B in step S913 (step S914), and acquires the authentication information of the user of terminal apparatus B (step S915). The CPU 33 of the server apparatus 14 checks using the program for the presentation system server apparatus stored in the storage unit 37 if the acquired authentication information matches information of the user database stored in the storage unit 37 (step S916). If it is determined as a result of checking that these two pieces of information do not match, an error is generated to end the processing; otherwise, the flow advances to step S917. In step S917, the CPU 33 of the server apparatus 14 stores data, which is requested by the data acquisition request received in step S914, of the presentation data or annotation data stored in the storage unit 37 in the RAM 36. The CPU 33 of the server apparatus 14 transmits the data stored in the RAM 36 to terminal apparatus B (step S918).

Figure 6:
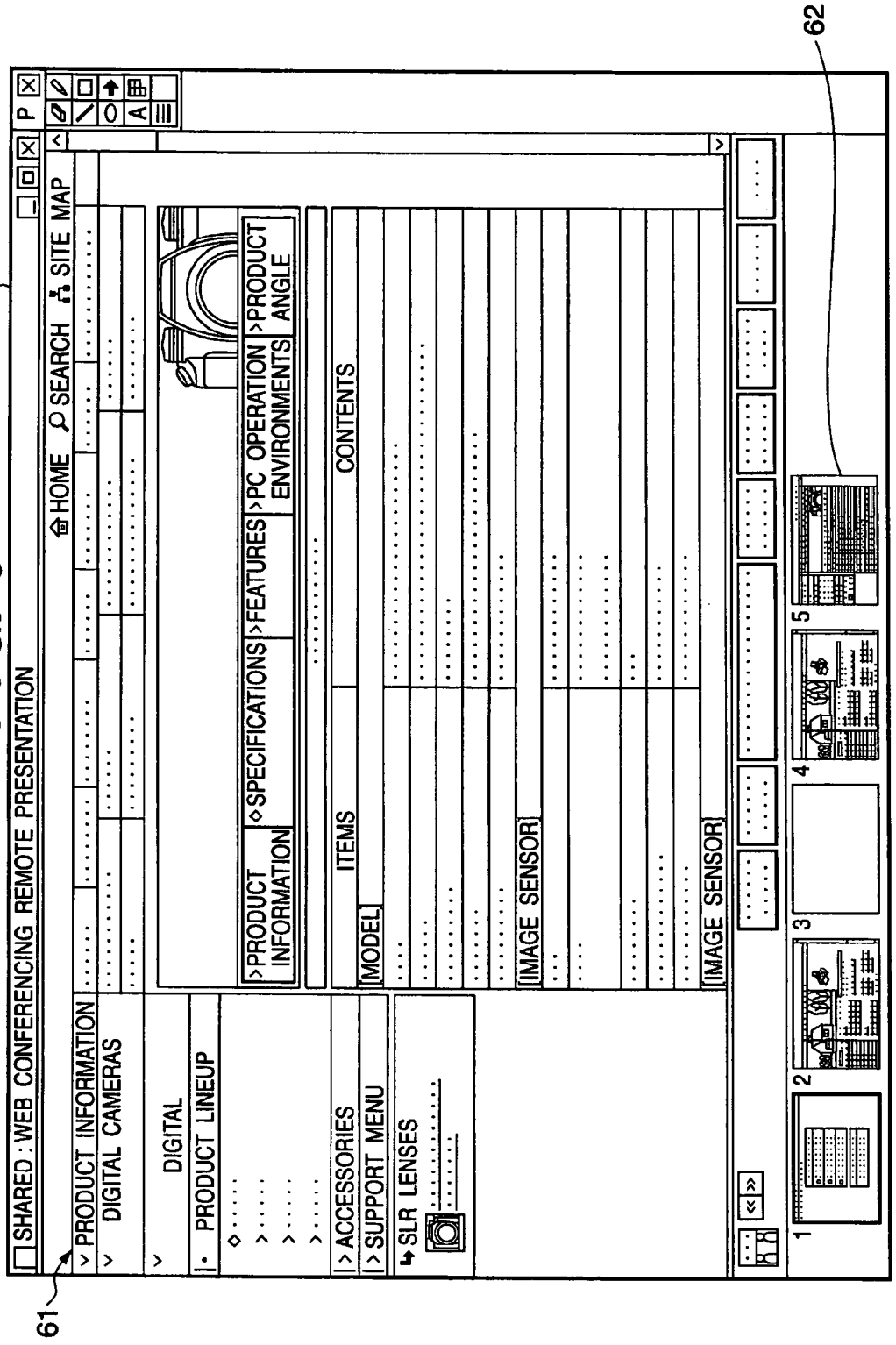
FIG. 6 shows an example of the presentation window based on newly added presentation data according to the first embodiment of the present invention.
Figure 7:
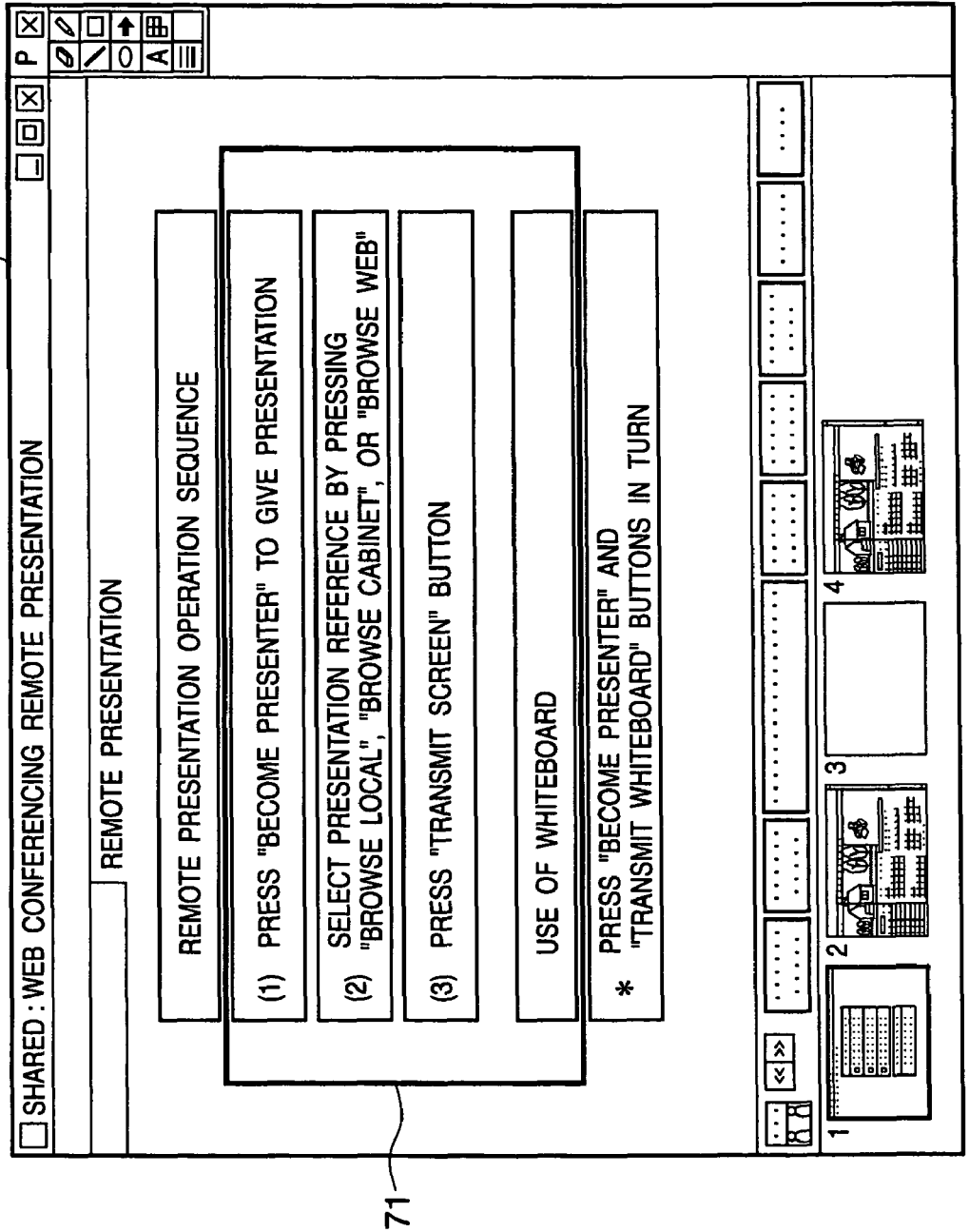
FIG. 7 shows an example of the presentation window that displays annotation data according to the first embodiment of the present invention.

The CPU 23 of terminal apparatus B receives the presentation data or annotation data transmitted from the server apparatus 14 in step S918 (step S919), and stores the received data in the RAM 26 (step S920). Upon reception of the presentation data in step S919, the CPU 23 of terminal apparatus B newly displays the presentation window 60 based on the received presentation data, as shown in FIG. 6. On the other hand, upon reception of the annotation data in step S919, the CPU 23 displays the annotation data 71, as shown in FIG. 7, thus ending the processing.

As described above, according to this embodiment, upon reception of the data updating information from the server apparatus 14 while the presentation window is "closed" or "minimized" on the display unit 24 of each of the terminal apparatuses 11 to 13, that presentation window is displayed on the display unit 24. Display information to be updated (presentation data or annotation data) is displayed on that presentation window. As a result, the user who uses one of the terminal apparatuses 11 to 13 can always recognize a change in situation of the presentation system (in real time).

That is, even when the presentation window is hidden, if a change in situation of the presentation system has taken place, since the presentation window is forcibly displayed, the user can recognize the current situation of the presentation system. Note that a change in situation of the presentation system means addition of new presentation data or new annotation data, or deletion of annotation data.

Since the server apparatus 14 attests both terminal apparatuses A and B, the security of the presentation system can be improved.

In this embodiment, upon reception of data updating information while the contents of the presentation window are hidden, that presentation window is displayed on the display unit 24. However, the present invention is not limited to such specific display timing of the presentation window. For example, upon reception of presentation data or annotation data while the contents of the presentation window are hidden on the display unit 24, each of the terminal apparatuses 11 to 13 may display that presentation window on the display unit 24.

Second Embodiment

The second embodiment of the present invention will be described in detail hereinafter.

In the aforementioned first embodiment, when the server apparatus 14 transmits presentation data or annotation data to each of the terminal apparatuses 11 to 13, it transmits data updating information, and then presentation data or annotation data. By contrast, in this embodiment, the server apparatus transmits presentation data or annotation data to the terminal apparatus from the start without any data updating information. In this manner, this embodiment is substantially the same as the first embodiment except for the processing of software programs in the server apparatus and terminal apparatuses upon transmitting presentation data or annotation data from the server apparatus to each terminal apparatus. Therefore, in the description of this embodiment, the same reference numerals denote the same parts as in the first embodiment shown in FIGS. 1 to 9, and a detailed description thereof will be omitted.

Figure 10:
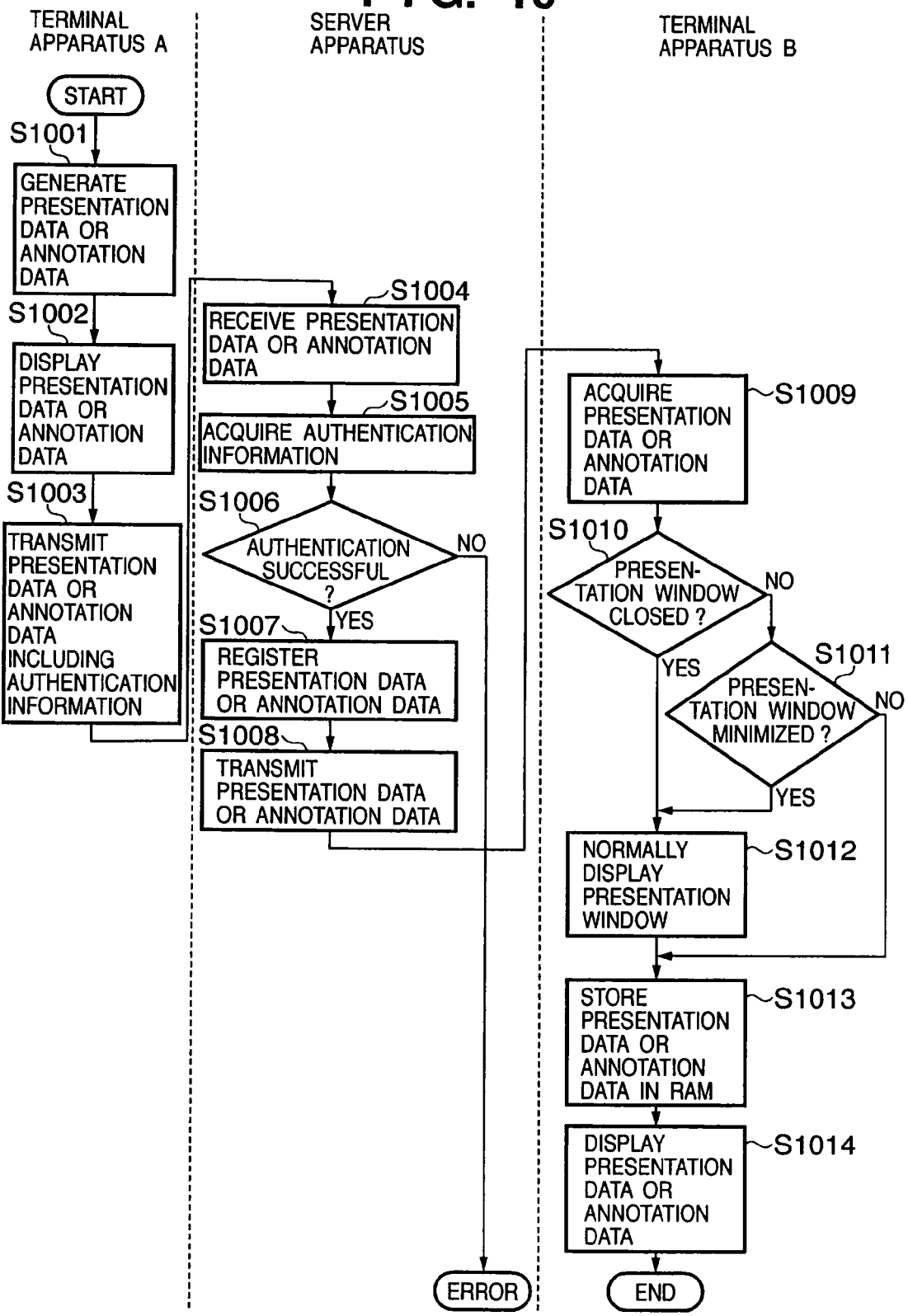
FIG. 10 is a flowchart for explaining an example of the operation of the presentation system upon sharing presentation data or annotation data according to the second embodiment of the present invention.

An example of the operation of the presentation system upon sharing presentation data or annotation data will be described with reference to FIG. 10. FIG. 10 also exemplifies a case wherein in order to share presentation data or annotation data, terminal apparatus A as an arbitrary one of the terminal apparatuses 11 to 13 sends data to terminal apparatus B as another one of the terminal apparatuses 11 to 13 via the server apparatus 14, as shown in FIG. 9.

The flowchart in FIG. 10 is implemented when the CPUs 23 and 33 execute processing based on the program data for the presentation system terminal apparatus, and the program data for the presentation system server apparatus, which are respectively stored in the storage units 27 and 37.

For the sake of simplicity, assume that the terminal apparatuses 11 to 13 and the server apparatus 14 have already established connection to the network 15 using their communication controllers 21 and 31 as in the first embodiment.

Also, assume that each of the terminal apparatuses 11 to 13 has already logged in the program for the presentation system server apparatus stored in the server apparatus 14 by executing the program for the presentation system terminal apparatus stored in the storage unit 27 in advance. Note that the processing in the presentation system is implemented by executing the program for the presentation system terminal apparatus stored in each of the terminal apparatuses 11 to 13, and the program for the presentation system server apparatus stored in the server apparatus 14.

Figure 4:
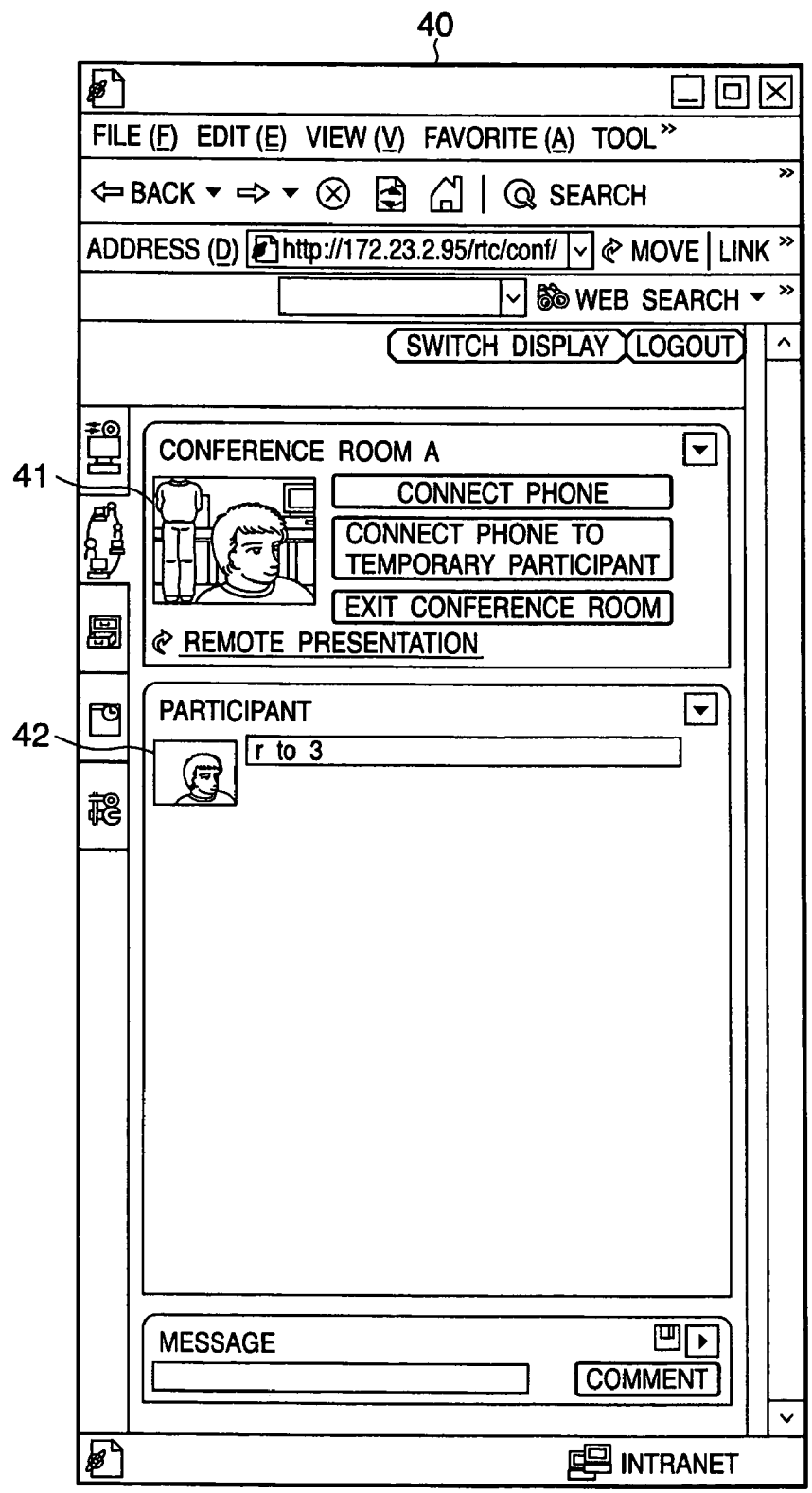
FIG. 4 shows an example of a conference room window screen according to the first embodiment of the present invention.
Figure 5:
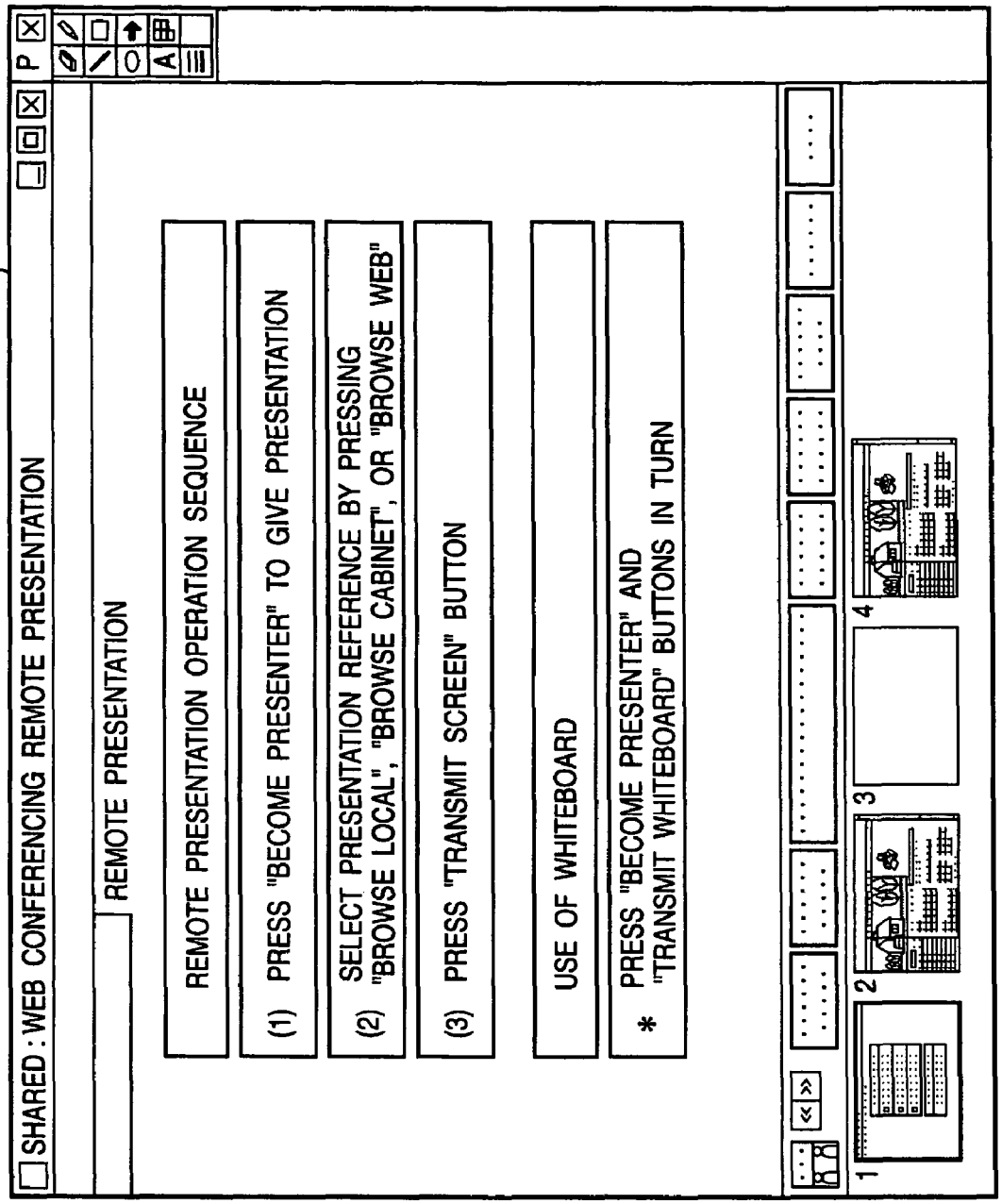
FIG. 5 shows an example of a presentation window according to the first embodiment of the present invention.

As in the first embodiment, when terminal apparatus A has logged in the presentation system, it displays the conference room window screen 40 shown in FIG. 4 on the display unit 24. When the user selects a link that describes "remote presentation" by operating the input unit 22 (mouse) on the conference room window screen 40, terminal window A displays the presentation window 50 shown in FIG. 5 on the display unit 24.

When presentation data is to be shared with other terminal apparatuses while the presentation window 50 is displayed on the display unit 24, the CPU 23 of terminal apparatus A generates presentation data on the RAM 26 (step S1001). The CPU 23 of terminal apparatus A displays the presentation window 60 based on the generated new presentation data on the display unit 24 (step S1002).

When annotation data is to be shared with other terminal apparatuses in the same state, the CPU 23 of terminal apparatus A generates annotation data on the RAM 26 (step S1001). The CPU 23 of terminal apparatus A displays the presentation window 70 added with the new annotation data 71 generated on the presentation window 50 on the display unit 24 (step S1002; see FIG. 7).

The CPU 23 of terminal apparatus A adds authentication information such as the user name of terminal apparatus A that uses the presentation system, session information, and the like to the presentation data or annotation data generated in step S1002. The CPU 23 of terminal apparatus A transmits the presentation data or annotation data added with the authentication information to the CPU 33 of the server apparatus 14 via the communication controller 21, the network 15, and the communication controller 31 of the server apparatus 14 (step S1003).

The CPU 33 of the server 14 receives the presentation data or annotation data transmitted from terminal apparatus A in step S1003 (step S1004), and acquires the authentication information of the user of terminal apparatus A (step S1005). The CPU 33 of the server apparatus 14 checks using the program for the presentation system server apparatus stored in the storage unit 37 if the acquired authentication information matches information of the user database stored in the storage unit 37 (step S1006). If it is determined as a result of checking that these two pieces of information do not match, an error is generated to end the processing; otherwise, the flow advances to step S1007.

In step S1007, the CPU 33 of the server apparatus 14 stores the presentation data or annotation data received in step S1004 in a presentation database in the storage unit 37. The CPU 33 of the server apparatus 14 then transmits the presentation data or annotation data to another terminal apparatus B which has logged in the presentation system (step S1008). Note that the other terminal apparatus B which has logged in the presentation system is, for example, a terminal apparatus possessed by a user who uses the same conference room as the user of terminal apparatus A.

After that, the CPU 23 of terminal apparatus B receives the presentation data or annotation data transmitted from the server apparatus 14 in step S1008 (step S1009). The CPU 23 of terminal apparatus B checks if the presentation window is closed on the display unit 24 (step S1010). If it is determined as a result of checking that the presentation window is closed, the flow advances to step S1012 while skipping step S1011.

On the other hand, if the presentation window is not closed, the flow advances to step S1011, and the CPU 23 of terminal apparatus B checks if the presentation window displayed on the display unit 24 is minimized. If it is determined as a result of checking that the presentation window is minimized, the flow advances to step S1013 while skipping step S1012. On the other hand, if the presentation window is not minimized, the flow advances to step S1012.

In step S1012, the CPU 23 of terminal apparatus B normally displays the presentation window 80 on the display unit 24, as shown in FIG. 8. The CPU 23 of terminal apparatus B stores the presentation data or annotation data transmitted from the server apparatus 14 in step S1008 in the RAM 26 (step S1013). Upon reception of the presentation data in step S1009, the CPU 23 of terminal apparatus B newly displays the presentation window 60 based on the received presentation data, as shown in FIG. 6. On the other hand, upon reception of the annotation data in step S1009, the CPU 23 displays the annotation data 71, as shown in FIG. 7, thus ending the processing.

As described above, according to this embodiment, upon reception of the presentation data or annotation data from the server apparatus 14 while the contents of the presentation window are hidden, that presentation window is displayed on the display unit 24. As a result, the user who uses one of the terminal apparatuses 11 to 13 can always recognize a change in situation of the presentation system (in real time). Also, the user can recognize a change in situation of the presentation system by processing simpler than in the first embodiment.

In the first and second embodiments, the terminal apparatuses 11 to 13 respectively set for a plurality of users communicate with the server apparatus 14 via the network 14. Alternatively, the terminal apparatuses 11 to 13 may have functions of the server apparatus 14. In this way, the need for the server apparatus 14 can be obviated, and the cost of equipment that forms the presentation system can be reduced.

In the first and second embodiments, the screen contents to be displayed on each of the terminal apparatuses 11 to 13 upon using the presentation system are not limited to those shown in FIGS. 4 to 8. For example, the conference room window and presentation window may be displayed on different monitors.

In the first and second embodiments, presentation data may include an identifier or the like which uniquely indicates that data in addition to the data itself. For example, the presentation data may include a document file generated using Microsoft Word®, a document file generated by Microsoft Power Point®, or an image file of, e.g., a JPEG format or the like, and an ID number, file name, or the like indicating such data.

Third Embodiment

The third embodiment of the present invention will be described in detail hereinafter. In the first and second embodiment, the server apparatus allows the users who use the terminal apparatuses 11 to 13 to always recognize a change in situation of the presentation system. By contrast, in this embodiment, the users recognize only a specific change in situation of the presentation system. In this way, this embodiment is substantially the same as the first embodiment, except for a method of notifying the user of a change in situation of the presentation system. Therefore, the same reference numerals denote the same parts as those in the first and second embodiments shown in FIGS. 1 to 10, and a detailed description thereof will be omitted.

Figure 11:
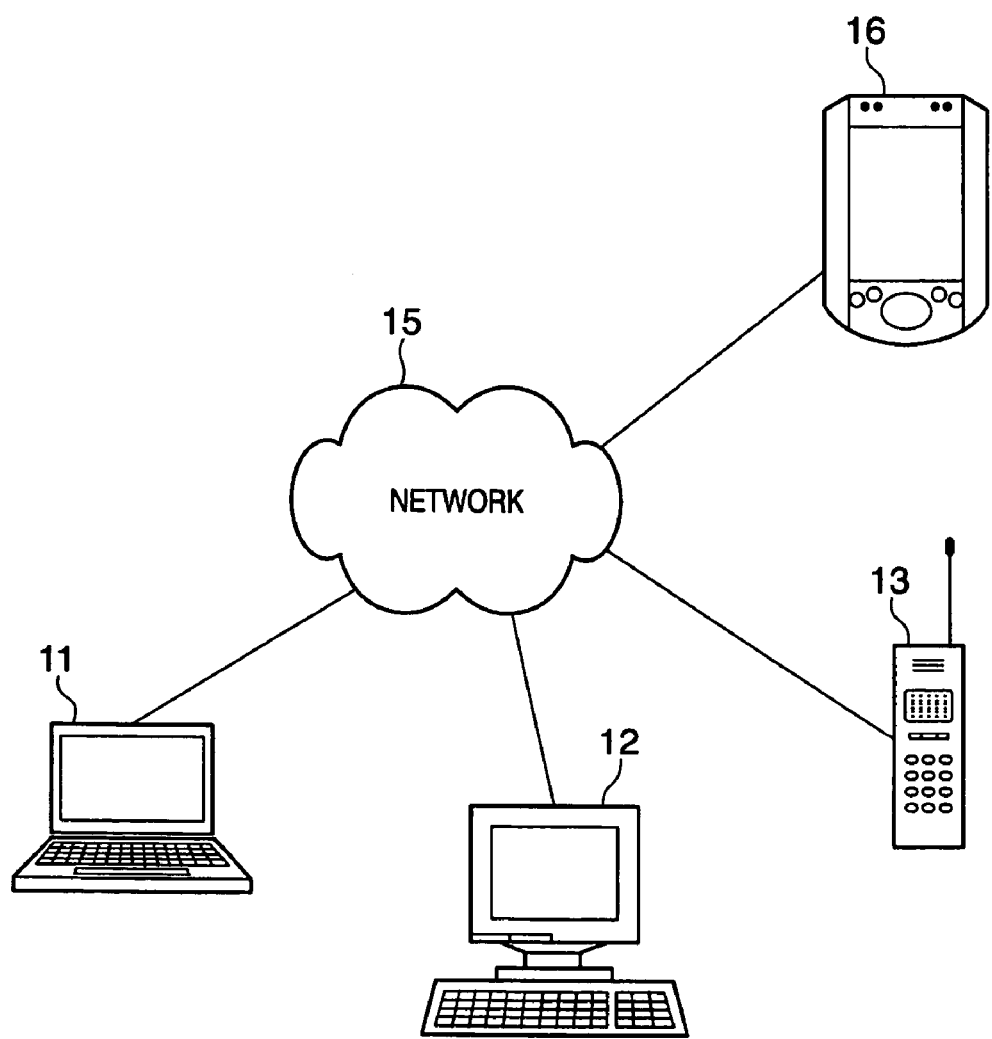
FIG. 11 is a view showing an example of the arrangement of a presentation system according to the third embodiment of the present invention.

FIG. 11 shows an example of the arrangement of the presentation system. As shown in FIG. 11, according to this embodiment, a terminal apparatus 16 is provided in place of the server apparatus 14 in the presentation system shown in FIG. 1. That is, the presentation system of this embodiment does not include any server apparatus. In this embodiment, the terminal apparatuses directly exchange data.

As in the first embodiment, each of terminal apparatuses 11 to 13 and 16 includes a communication function, and is connected to the network 15. Note that each of the terminal apparatuses 11 to 13 and 16 comprises a terminal computer and program data for a presentation system. Since the hardware arrangement of each of the terminal apparatuses 11 to 13 and 16 is the same as that shown in FIG. 2, a detailed description thereof will be omitted.

Figure 13:
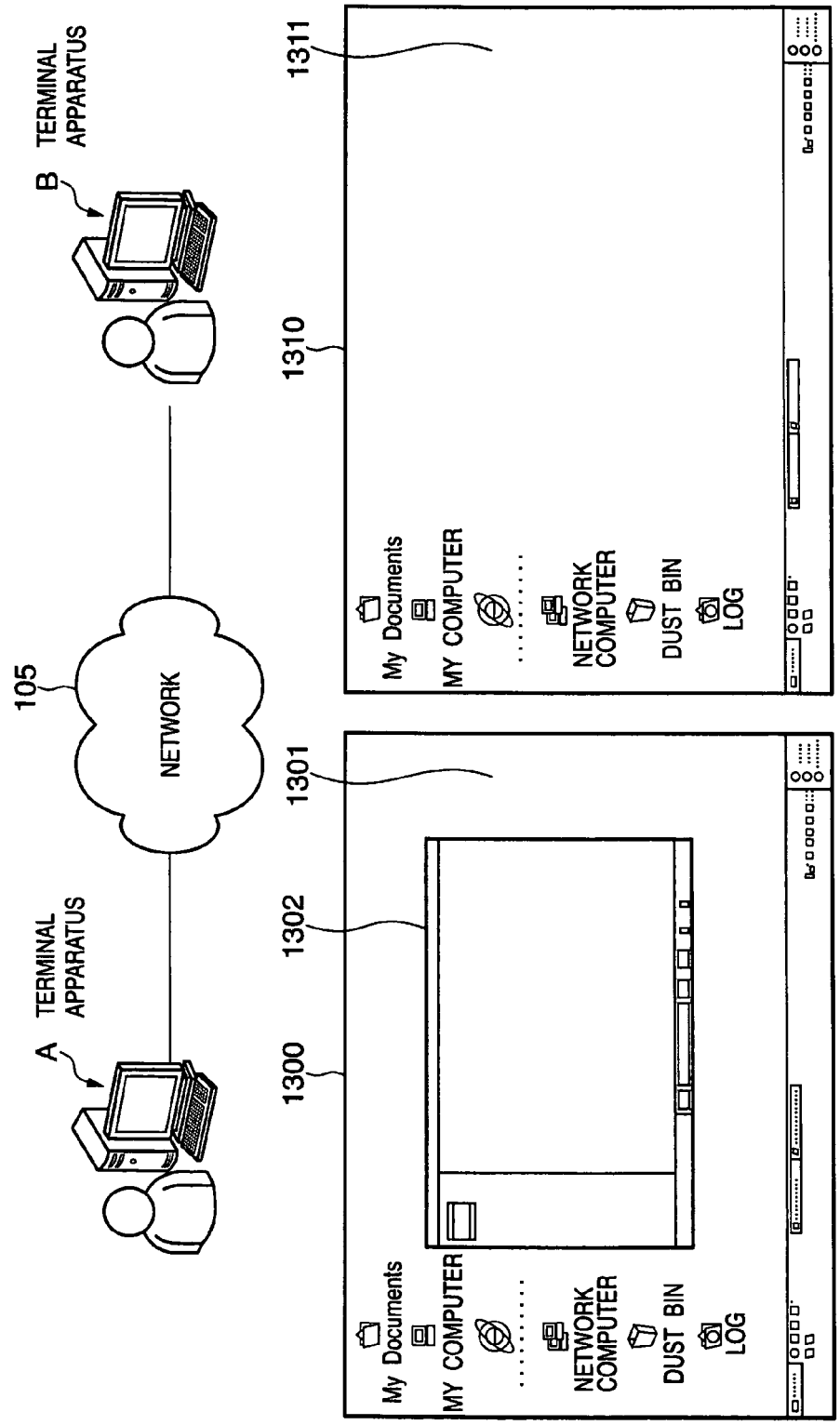
FIG. 13 shows the first example of screens displayed on terminal apparatuses A and B upon exchanging data between them according to the third embodiment of the present invention.
Figure 14:
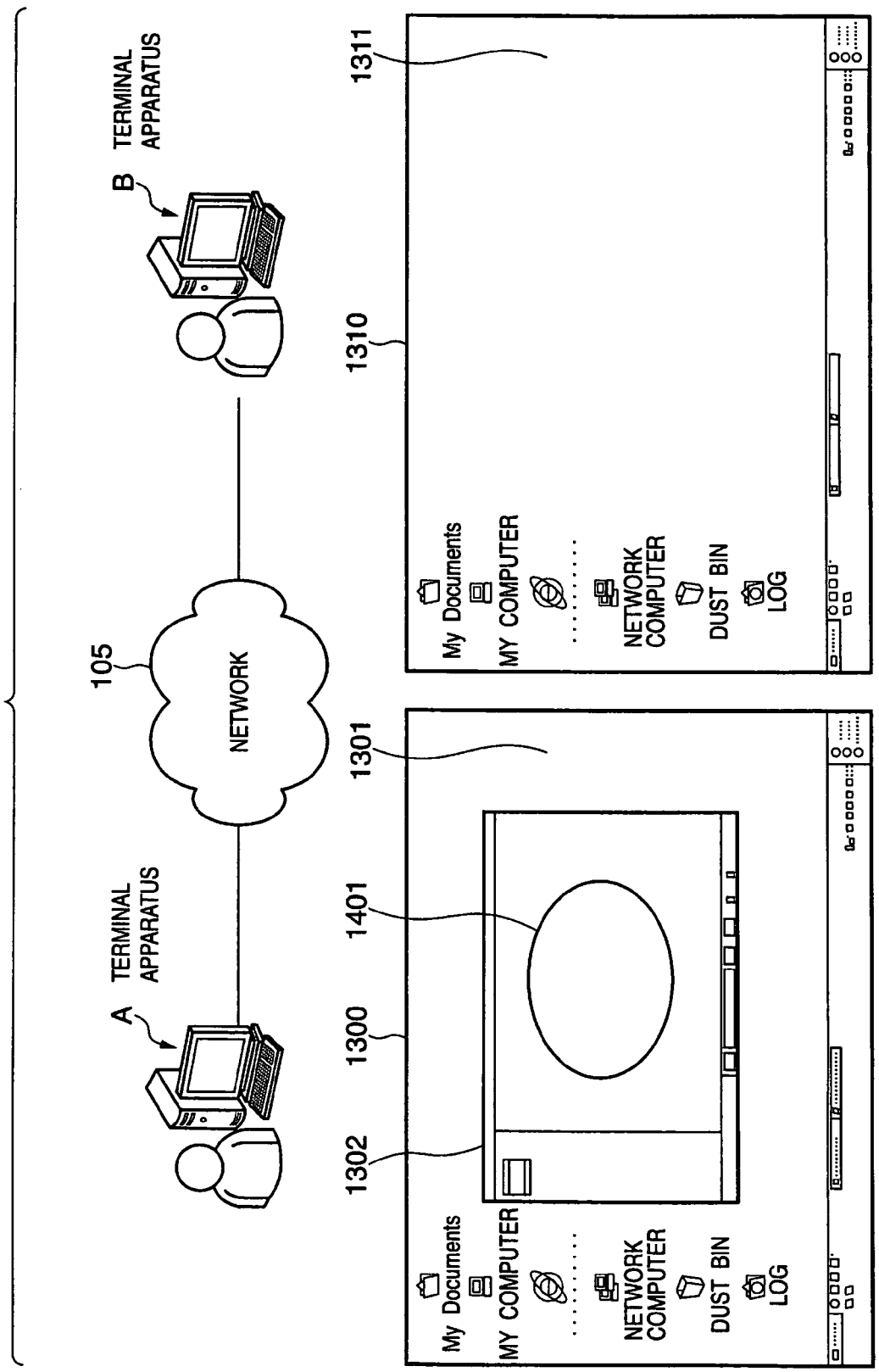
FIG. 14 shows the second example of screens displayed on terminal apparatuses A and B upon exchanging data between them according to the third embodiment of the present invention.
Figure 15:
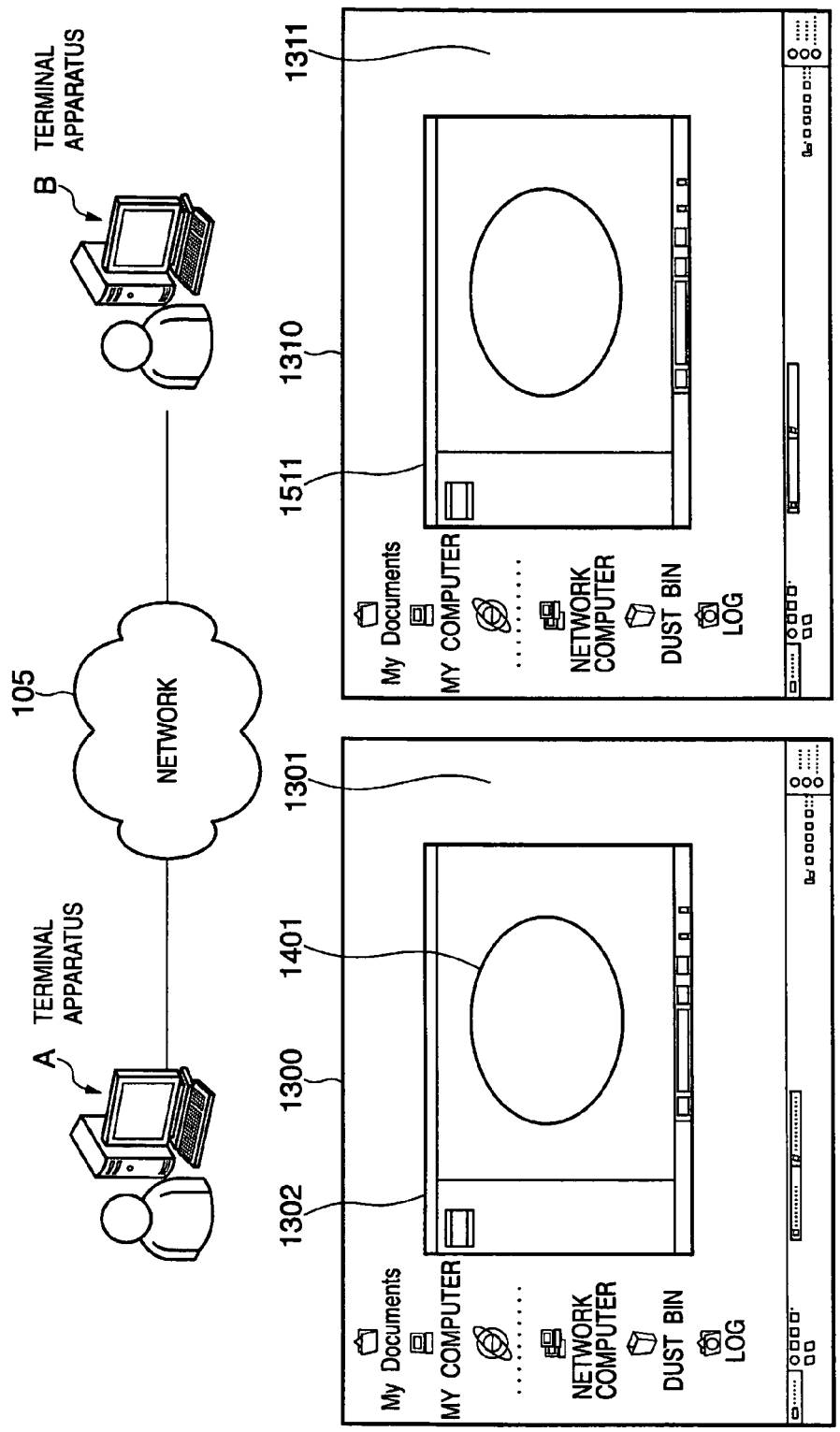
FIG. 15 shows the third example of screens displayed on terminal apparatuses A and B upon exchanging data between them according to the third embodiment of the present invention.

An example of the operation of the presentation system upon exchanging data between the terminal apparatuses will be described below with reference to the flowchart in FIG. 12. This embodiment will exemplify a case wherein terminal apparatuses A and B as arbitrary two out of the terminal apparatuses 11 to 13 and 16 exchange data, as shown in FIGS. 13 to 15. FIGS. 13 to 15 show an example of screens displayed on terminal apparatuses A and B when terminal apparatuses A and B exchange data.

Figure 12:
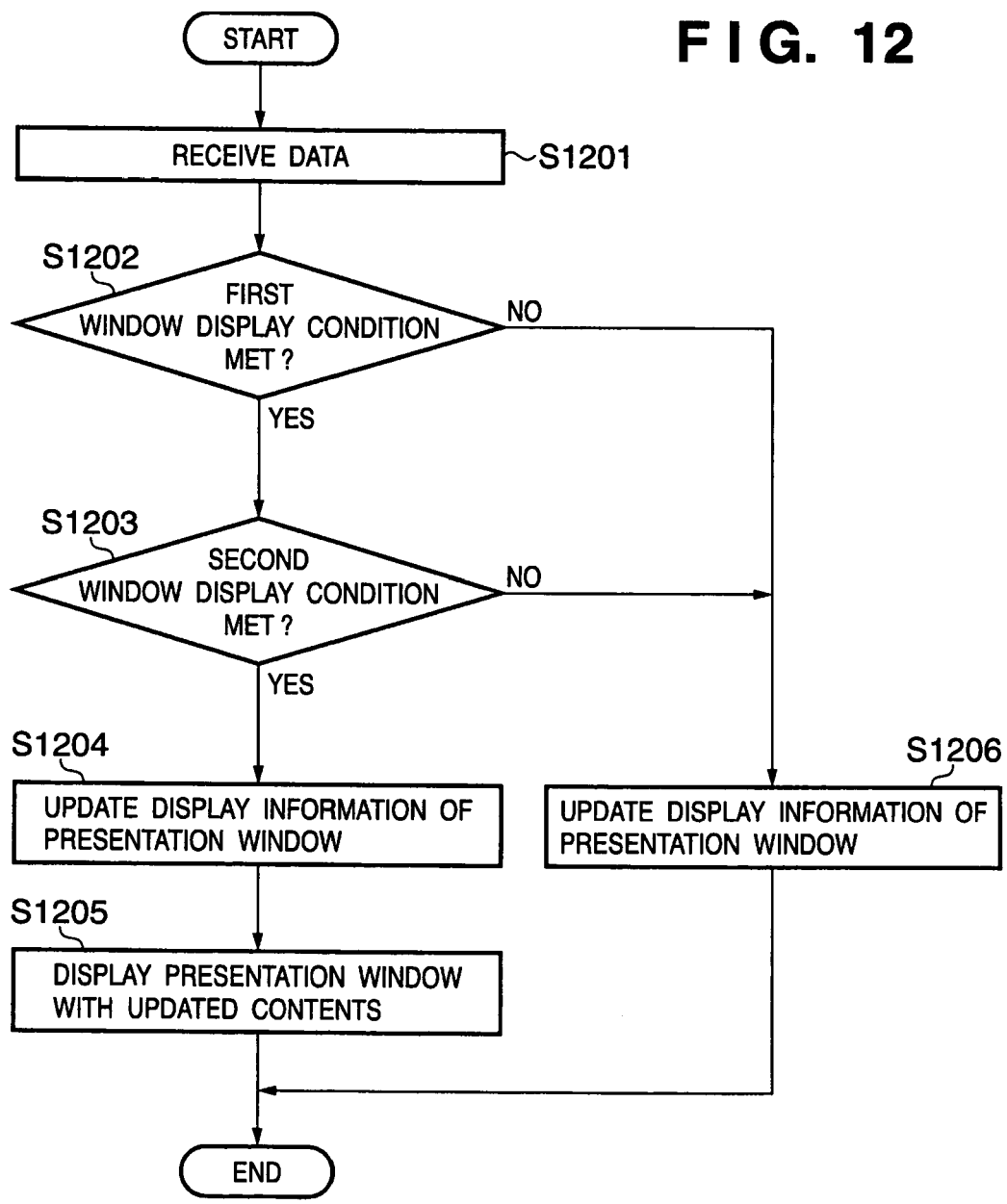
FIG. 12 is a flowchart for explaining an example of the operation of the presentation system upon exchanging data between terminal apparatuses according to the third embodiment of the present invention.

The flowchart in FIG. 12 is implemented when the CPU 23 executes the processing based on the program data for the presentation system stored in the storage unit 27 of each of terminal apparatuses A and B.

For the sake of simplicity, assume that terminal apparatuses A and B have already established connection to the network 15 using their communication controllers 21.

Also, assume that terminal apparatuses A and B are already connected to each other by executing the programs for the presentation system stored in the storage units 27.

At the beginning of the processing shown in the flowchart of FIG. 12, a desktop screen 1301 is displayed on a display screen 1300 of terminal apparatus A, as shown in FIG. 13. Furthermore, the program for the presentation system is launched, and a presentation window 1302 is displayed. On the other hand, a desktop screen 1311 is displayed on a display screen 1310 of terminal apparatus B. Furthermore, the program for the presentation system is launched in terminal apparatus B. However, on the display screen 1310 of terminal apparatus B, the user cannot see the contents of the presentation window since it is minimized or closed.

In such state, when the user of terminal apparatus A draws drawing data 1401 on the presentation window 1302 using the input unit 22, the CPU 23 of terminal apparatus A receives that drawing data 1401 (see FIG. 14). The CPU 23 of terminal A transmits transmission data including the received drawing data 1401 to terminal apparatus B via the communication controller 21 and network 15.

Note that the transmission data transmitted from terminal apparatus A includes not only the drawing data 1401 drawn on the presentation window 1302 but also all data required to allow terminal apparatus B to update the displayed contents of the presentation window (e.g., data that commands to switch the displayed contents of the presentation window and the like).

Referring to FIG. 12, when the communication controller 21 receives the transmission data transmitted from terminal apparatus A, the CPU 23 of terminal apparatus B records the received data in the RAM 26 (step S1201). Next, the CPU 23 of terminal apparatus B checks if the data received in step S1201 meets a predetermined data condition (first window display condition) (step S1202). If it is determined as a result of checking that the received data does not meet the first window display condition, the flow advances to step S1206 to be described later. On the other hand, if the received data meets the first window display condition, the flow advances to step S1203.

Note that the first window display condition includes information and the like such as (a) to (g) as follows:

(a) presentation data such as image data, document data, or the like;

(b) an identifier used to designate image data, document data, or the like; (c) annotation data such as graphic data, text data, or the like;

(d) an identifier used to designate a specific importance or state;

(e) an identifier used to designate emergency or an alert;

(f) an identifier used to designate a terminal apparatus which is to receive data; and (g) an identifier used to designate the user associated with the terminal apparatus which is to receive data.

For example, it is checked in step S1202 if the received data has at least one of the above seven pieces of information (a) to (g) included in the first window display condition.

After the flow advances to step S1203, the CPU 23 of terminal apparatus B checks if the presentation window associated with the data received in step S1201 meets a predetermined window condition (second window display condition). If it is determined as a result of checking that the presentation window associated with the received data does not meet the second window display condition, the flow advances to step S1206 to be described later. If the presentation window associated with the received data meets the second window display condition, the flow advances to step S1204.

Note that the second window display condition includes, e.g., data indicating if the window is "closed", "minimized", "not displayed at the frontmost position", or the like on the desktop screen 1311. For example, it is checked in step S1203 if the received data corresponds to any of data in the second window display condition.

After the flow advances to step S1204, the CPU 23 of terminal apparatus B updates display information on the presentation window associated with the received data based on the data received in step S1201. Next, the CPU 23 of terminal apparatus B displays a presentation window 1511 updated in step S1204 on the desktop screen 1311 of the display screen 1310 using the display unit 24 (step S1205; see FIG. 15), thus ending the processing.

The display method of the presentation window 1511 includes a method of displaying the minimized display window in its original size, a method of updating the Z-order of the presentation window to display it at the frontmost position, and the like.

If the first window display condition is not met in step S1202 or if the second window display condition is not met in step S1203, the flow advances to step S1206. In step S1206, the CPU 23 of terminal apparatus B updates display information on the presentation window associated with the received data based on the data received in step S1201 as in step S1204, thus ending the processing.

As described above, according to this embodiment, terminal apparatus B checks if the received data meets the first window display condition, and if the presentation window displayed on the desktop screen 1311 meets the second window display condition. If it is determined as a result of checking that these first and second window display conditions are met, the presentation window 1511 associated with the received data is displayed at the frontmost position of the desktop screen 1311. In this manner, the user who uses one of the terminal apparatuses 11 to 13 and 16 can recognize a specific change in situation of the presentation system in real time.

Fourth Embodiment

The fourth embodiment of the present invention will be described in detail hereinafter. In the third embodiment, immediately after each of the terminal apparatuses 11 to 13 and 16 receives data, the presentation window associated with that data is displayed. By contrast, in the fourth embodiment, upon reception data by the terminal apparatus, after the use situation of the input unit (input device) of the terminal apparatus is checked, the presentation window associated with the received data is displayed. That is, when the input unit is not used, the presentation window is displayed instantly. However, when the input unit is used, the presentation window is displayed after the control waits until the use of the input unit is stopped for a predetermined period of time. In this way, this embodiment is substantially the same as the third embodiment, except that the display timing of the presentation window is changed depending on the use situation of the input unit upon reception of the data. Therefore, the same reference numerals denote the same parts as those in the first to third embodiments shown in FIGS. 1 to 15, and a detailed description thereof will be omitted.

An example of the operation of the presentation system upon exchanging data between the terminal apparatuses will be described below with reference to the flowchart in FIG. 16. This embodiment will exemplify a case wherein terminal apparatuses A and B as arbitrary two out of the terminal apparatuses 11 to 13 and 16 exchange data, as shown in FIGS. 17 to 19. FIGS. 17 to 19 show an example of screens displayed on terminal apparatuses A and B when terminal apparatuses A and B exchange data.

Figure 16:
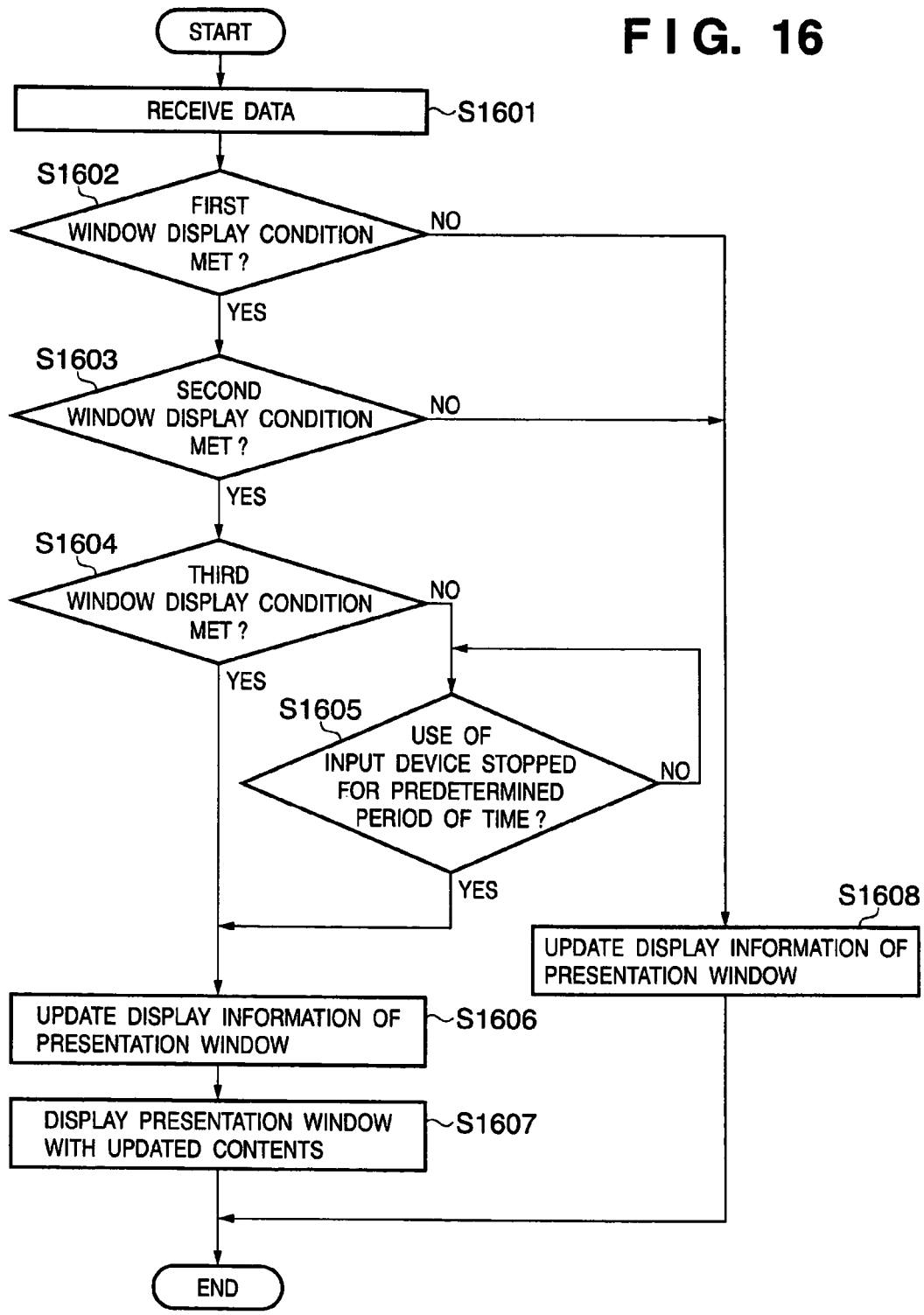
FIG. 16 is a flowchart for explaining an example of the operation of a presentation system upon exchanging data between terminal apparatuses according to the fourth embodiment of the present invention.

The flowchart in FIG. 16 is also implemented when the CPU 23 executes the processing based on the program data for the presentation system stored in the storage unit 27 of each of terminal apparatuses A and B, as in the third embodiment.

For the sake of simplicity, assume that terminal apparatuses A and B have already established connection to the network 15 using their communication controllers 21.

Also, assume that terminal apparatuses A and B are already connected to each other by executing the programs for the presentation system stored in the storage units 27.

At the beginning of the processing shown in the flowchart of FIG. 16, a desktop screen 1701 is displayed on a display screen 1700 of terminal apparatus A, as shown in FIG. 17. Furthermore, the program for the presentation system is launched, and a presentation window 1702 is displayed. On the other hand, a desktop screen 1711 is displayed on a display screen 1710 of terminal apparatus B. Furthermore, the program for the presentation system is launched in terminal apparatus B, and a presentation window 1712 is displayed. However, since a window 1713 of another application is displayed on the presentation window 1712, the user cannot see the entire area of the presentation window 1712.

In such state, when the user of terminal apparatus A draws drawing data 1801 on the presentation window 1702, the CPU 23 of terminal apparatus A receives that drawing data 1801 (see FIG. 18). The CPU 23 of terminal A transmits transmission data including the received drawing data 1801 to terminal apparatus B 15, via the communication controller 21 and network 15.

Note that the transmission data transmitted from terminal apparatus A includes not only the drawing data 1801 drawn on the presentation window 1702 but also all data required to allow terminal apparatus B to update the displayed contents of the presentation window (e.g., data that commands to switch the displayed contents of the presentation window and the like), as in the third embodiment.

Referring to FIG. 16, when the communication controller 21 receives the transmission data transmitted from terminal apparatus A, the CPU 23 of terminal apparatus B records the received data in the RAM 26 (step S1601). Next, the CPU 23 of terminal apparatus B checks if the data received in step S1601 meets a predetermined data condition (first window display condition) (step S1602). If it is determined as a result of checking that the received data does not meet the first window display condition, the flow advances to step S1608 to be described later. On the other hand, if the received data meets the first window display condition, the flow advances to step S1603.

Note that the first window display condition includes information and the like such as (a) to (g) mentioned above as in the third embodiment.

After the flow advances to step S1603, the CPU 23 of terminal apparatus B if the presentation window associated with the data received in step S1601 meets a predetermined window condition (second window display condition). If it is determined as a result of checking that the presentation window associated with the received data does not meet the second window display condition, the flow advances to step S1608 to be described later. If the presentation window associated with the received data meets the second window display condition, the flow advances to step S1604.

Note that the second window display condition includes, e.g., data indicating if the window is "closed", "minimized", "not displayed at the frontmost position", or the like on the desktop screen 1711, as in the third embodiment.

After the flow advances to step S1604, the CPU 23 of terminal apparatus B checks if a third window display condition is met (if the input unit 22 (input device) is not used). If it is determined as a result of checking that the third window display condition is met and the input unit 22 (input device) is not used, the flow advances to step S1606 while skipping step S1605. On the other hand, if the third window display condition is not met, and the input unit 22 (input device) is used, the flow advances to step S1605. In step S1605, the CPU 23 of terminal apparatus B waits until the use of the input unit 22 (input device) is stopped for a predetermined period of time. Upon detection of the fact that the use of the input unit 22 (input device) is stopped for the predetermined period of time, the flow advances to step S1606. As described above, the input unit 22 (input device) is a user interface including the keyboard, mouse, and the like.

After the flow advances to step S1606, the CPU 23 of terminal apparatus B updates the display contents on the presentation window associated with the received data based on the data received in step S1601. Next, the CPU 23 of terminal apparatus B displays a presentation window 1712 updated in step S1604 on the desktop screen 1711 of the display screen 1710 using the display unit 24 (step S1607; see FIG. 17), thus ending the processing.

As in the third embodiment, the display method of the presentation window 1712 includes a method of displaying the minimized display window in its original size, a method of updating the Z-order of the presentation window to display it at the frontmost position, and the like.

If the first window display condition is not met in step S1602 or if the second window display condition is not met in step S1603, the flow advances to step S1608. In step S1608, the CPU 23 of terminal apparatus B updates display information on the presentation window associated with the received data based on the data received in step S1601 as in step S1604, thus ending the processing.

As described above, according to this embodiment, when the user does not use the input unit 22 (input device), terminal apparatus B displays the presentation window 1712 associated with the received data at the frontmost position of the desktop screen 1711. In this manner, as in the third embodiment, the user who uses one of the terminal apparatuses 11 to 13 and 16 can recognize a specific change in situation of the presentation system. Furthermore, when the user uses another application, he or she can be notified of a specific change in situation of the presentation system after the use of that application is completed. In this way, the user can recognize a specific change in situation of the presentation system without disturbing the use of another application. Hence, when the user uses another application he or she can freely hide the presentation window.

More specifically, in the conventional presentation system, when the user uses another application, he or she repetitively displays and hides the presentation window to confirm a change in situation of the presentation system. However, the presentation system of this embodiment can obviate the need for such user's operation.

In the third and fourth embodiments, the presentation system includes not only the aforementioned P2P arrangement but also the arrangement comprising a client and server. For example, as in the first and second embodiments, an arrangement in which terminal apparatus A transmits data to terminal apparatus B via the server apparatus can be adopted.

Furthermore, in the first to fourth embodiments, the presentation system includes not only an arrangement comprising a large number of terminal apparatuses but also an arrangement comprising one or two terminal apparatuses.

Other Embodiments of the Present Invention

A program code of software required to implement the functions of the above embodiments may be applied to a computer in an apparatus or system connected to various devices so as to operate these devices to implement the functions of the aforementioned embodiments. The scope of the present invention includes the invention practiced by operating such devices in accordance with a program stored in the computer (a CPU or MPU) in the system or apparatus.

In this case, the program code itself of software implements the functions of the above embodiments. The program code itself, and means for supplying the program code to the computer (e.g., a recording medium which stores the program code) constitutes the present invention. As the recording medium for storing the program code, for example, a flexible disk, hard disk, optical disk, magneto-optical disk, CD-ROM, magnetic tape, nonvolatile memory card, ROM, and the like may be used.

The present invention is not limited to a case wherein the functions of the above embodiments are implemented when the computer executes the supplied program code. For example, the functions of the above embodiments may be implemented by collaboration of the program code and an operating system running on the computer, another application software, or the like. In such case, the program code is included in the embodiments of the present invention.

Furthermore, the supplied program code may be stored in a memory equipped on a function extension board of the computer connected to the computer, and a CPU or the like equipped on the function extension board then executes some or all of actual processes on the basis of the instruction of that program code. A case wherein the functions of the above embodiments are implemented by those processes is also included in the present invention.

Moreover, the supplied program code may be stored in a memory equipped on a function extension unit connected to the computer connected to the computer, and a CPU or the like equipped on the function extension unit then executes some or all of actual processes on the basis of the instruction of that program code. A case wherein the functions of the above embodiments are implemented by those processes is also included in the present invention.

Note that the aforementioned embodiments merely indicate practical examples upon practicing the present invention, and the technical scope of the present invention should not be limitedly interpreted based on these embodiments. That is, the present invention can be practiced in various modes without departing from its technical scope or its principal features.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-147021 filed on May 19, 2005, which is hereby incorporated by reference herein its entirety.

What is claimed is:

1. A terminal apparatus that transmits and receives data via a network and shares a window associated with the data between said terminal apparatus and a transmission apparatus for transmitting the data, said terminal apparatus comprising:
   a data communication unit adapted to transmit and receive the data for displaying on the window;
   a window display control unit adapted to control a display of the window associated with the data received by said data communication unit on a display screen;
   a data condition determination unit adapted to determine, in a case where data for updating the window is received by said data communication unit, whether or not the data for updating the window match a first window display condition based on contents of the data for updating the window;
   a window display condition determination unit adapted to determine, in the case where the data for updating the window is received by said data communication unit, whether or not the data for updating the window matches a second window display condition based on a display state of the window associated with the received data in regard to at least one of (i) whether or not the window associated with the received data is closed, (ii) whether or not that window is minimized, and (iii) whether or not that window is displayed at a frontmost position; and a display information updating unit adapted to update data to be displayed in the window controlled by said window display control unit based on the data for updating the window, wherein, in a case where said data condition determination unit determines that the data for updating the window matches the first window display condition and said window display condition determination unit determines that the data for updating the window matches the second window display condition, said window display control unit displays the data updated by said display information updating unit at the frontmost position on the display screen.

2. The apparatus according to claim 1, wherein, on condition that said data communication unit receives data, said data condition determination unit determines whether or not the received data includes presentation data having at least one of image data and document data.

3. The apparatus according to claim 1, wherein, on condition that said data communication unit receives data, said data condition determination unit determines whether or not the received data includes an identifier that can designate at least one of image data and document data.

4. The apparatus according to claim 1, wherein, on condition that said data communication unit receives data, said data condition determination unit determines whether or not the received data includes annotation data having at least one of graphic data and text data.

5. The apparatus according to claim 1, wherein, on condition that said data communication unit receives data, said data condition determination unit determines whether or not the received data includes an identifier that designates at least one of a specific importance and state.

6. The apparatus according to claim 1, wherein, on condition that said data communication unit receives data, said data condition determination unit determines whether or not the received data includes an identifier that indicates at least one of an emergency and alert.

7. The apparatus according to claim 1, wherein, on condition that said data communication unit receives data, said data condition determination unit determines whether or not the received data includes an identifier that designates said terminal apparatus itself.

8. The apparatus according to claim 1, wherein, on condition that said data communication unit receives data, said data condition determination unit determines whether or not the received data includes an identifier that designates a user associated with said terminal apparatus itself.

9. The apparatus according to claim 1, wherein, on condition that said data communication unit receives data indicating to update display information on the window, said window display control unit controls a display of a window associated with the display information to be updated on the display screen, and on condition that said data communication unit receives data indicating the display information to be updated, said display information updating unit displays display information on the window controlled by said window display control unit based on the received data.

10. The apparatus according to claim 1, further comprising:

a use situation determination unit adapted to determine a use situation of an input device on condition that said data communication unit receives data, wherein said window display control unit controls a display of a window associated with the received data on the display screen in accordance with the use situation of the input device determined by said use situation determination unit.

11. The apparatus according to claim 10, wherein, on condition that said use situation determination unit determines that the input device is not used, said window display control unit controls a display of the window associated with the received data on the display screen, and on condition that said use situation determination unit determines that the input device is used, said window display control unit controls a display of the window associated with the received data on the display screen after waiting for use of the input device is stopped for a predetermined period of time.

12. A network system comprising:
a plurality of terminal apparatuses of claim 1; and
a network adapted to interconnect said plurality of terminal apparatuses to be able to communicate with each other.

13. A window display method executed by a terminal apparatus that transmits and receives data via a network and shares a window associated with the data between the terminal apparatus and a transmission apparatus for transmitting the data, said window display method comprising:

a data communication step of transmitting and receiving the data for displaying on the window;

a window display control step of controlling a display of the window associated with the data received in the data communication step on a display screen;

a data condition determination step of determining, in a case where data for updating the window is received in said data communication step, whether or not the data for updating the window match a first window display condition based on contents of the data for updating the window;

a window display condition determination step of determining, in the case where the data for updating the window is received in said data communication step, whether or not the data for updating the window matches a second window display condition based on a display state of the window associated with the received data in regard to at least one of (i) whether or not the window associated with the received data is closed, (ii) whether or not that window is minimized, and (iii) whether or not that window is displayed at a frontmost position; and a display information updating step of updating data to be displayed in the window controlled in said window display control step based on the data for updating the window, wherein, in a case where it is determined in said data condition determination step that the data for updating the window matches the first window display condition and it is determined in said window display condition determination step that the data for updating the window matches the second window display condition, in said window display control step the data updated in said display information updating step is displayed at the frontmost position on the display screen.

14. The method according to claim 13, further comprising:
a use situation determination step of determining a use situation of an input device on condition that data is received in said data communication step, wherein the said window display control step includes a step of controlling a display of a window associated with the received data on the display screen in accordance with the use situation of the input device determined in said use situation determination step.

15. A computer readable storage medium storing, in executable form, a program for causing a computer to execute a window display method executed by a terminal apparatus that transmits and receives data via a network and shares a window associated with the data between the terminal apparatus and a transmission apparatus for transmitting the data, the window display method comprising:

- a data communication step of transmitting and receiving the data for displaying on the window;
- a window display control step of controlling a display of the window associated with the data received in the data communication step on a display screen;
- a data condition determination step of determining, in a case where data for updating the window is received in the data communication step, whether or not the data for updating the window match a first window display condition based on contents of the data for updating the window;
- a window display condition determination step of determining, in the case where the data for updating the window is received in the data communication step, whether or not the data for updating the window matches a second window display condition based on a display state of the window associated with the received data in regard to at least one of (i) whether or not the window associated with the received data is closed, (ii) whether or not that window is minimized, and (iii) whether or not that window is displayed at a frontmost position; and
- a display information updating step of updating data to be displayed in the window controlled in the window display control step based on the data for updating the window, wherein, in a case where it is determined in the data condition determination step that the data for updating the window matches the first window display condition and it is determined in the window display condition determination step that the data for updating the window matches the second window display condition, in the window display control step the data updated in the display information updating step is displayed at the frontmost position on the display screen.

* * * * *